US012811517B2

(12) United States Patent
Suefuji

(10) Patent No.: US 12,811,517 B2
(45) Date of Patent: Nov. 24, 2026

(54) VIBRATION ACTUATOR AND DRIVING DEVICE

(71) Applicant: CANON KABUSHIKI KAISHA, Tokyo (JP)

(72) Inventor: Kei Suefuji, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 18/433,094

(22) Filed: Feb. 5, 2024

(65) Prior Publication Data

US 2024/0275309 A1 Aug. 15, 2024

(30) Foreign Application Priority Data

Feb. 15, 2023 (JP) ................................ 2023-021649

(51) Int. Cl.

| | |
|---|---|
| ***H02N 2/00*** | (2006.01) |
| ***G03B 13/34*** | (2021.01) |
| ***H02N 2/02*** | (2006.01) |
| ***H02N 2/10*** | (2006.01) |
| *G02B 21/36* | (2006.01) |

(52) U.S. Cl.

CPC .......... *H02N 2/0055* (2013.01); *G03B 13/34* (2013.01); *H02N 2/028* (2013.01); *H02N 2/103* (2013.01); *G02B 21/362* (2013.01)

(58) Field of Classification Search

CPC .................................................. H02N 2/0055

See application file for complete search history.

(56) References Cited

U.S. PATENT DOCUMENTS

| | | | | |
|---|---|---|---|---|
| 2018/0041141 | A1* | 2/2018 | Shinzato | H02N 2/0015 |
| 2020/0382023 | A1* | 12/2020 | Shimada | H02N 2/026 |

FOREIGN PATENT DOCUMENTS

| | | | |
|---|---|---|---|
| JP | 2020198658 | A | 12/2020 |

* cited by examiner

*Primary Examiner* — Edmond C Lau

(74) *Attorney, Agent, or Firm* — Canon U.S.A., Inc. IP Division

(57) ABSTRACT

A vibration actuator includes a vibrating body, a contact body, and an abutment body. The vibrating body includes an electro-mechanical energy conversion element and an elastic body and have two vibration modes having a common node area that is of both the two vibration modes and is shared between the two vibration modes. The contact body comes into contact with the elastic body. The abutment body includes an abutment member that abuts on the common node area on a side opposite to a side on which the abutment body faces the contact body. The vibration actuator is configured such that an attraction force between the vibrating body and the abutment body is generated by a magnetic force.

19 Claims, 11 Drawing Sheets

VIBRATION MODE A

VIBRATION MODE B

VIBRATION MODE A

VIBRATION MODE B

VIBRATION ACTUATOR AND DRIVING DEVICE

BACKGROUND

Field

The present disclosure relates to a vibration actuator and a driving device.

Description of the Related Art

Generally, a vibration actuator brings a vibrating body and a driving target body into contact with each other and frictionally drives the vibrating body and the driving target body relative to each other by a vibration induced in the vibrating body, so that the vibration actuator generates a driving force. This feature allows the vibration actuator to have a simple and thin structure and to be driven quietly with high accuracy. The vibration actuator has been applied to a driving motor for a rotary driving apparatus, such as a lens barrel or a camera platform, a manufacturing apparatus in factory automation (FA), or an office automation (OA) device. For example, Japanese Patent Application Laid-Open No. 2020-198658 discloses a vibration wave motor having a vibrator, a contact body, and a support member where the support member movably supports an outer peripheral part of the vibrator in a direction of pressurization.

There are some conventional example vibration actuators that work towards reducing the number of components of a vibration actuator to miniaturize the vibration actuator and also for preventing occurrence of abnormal noises. Specifically, the vibration actuator may have a structure where an abutment member that abuts on a vibrating body is configured to abut on the vibrating body at a node area of vibration generated by the vibrating body, which maintains the orientation of the vibrating body. With this configuration, the vibrating body is held without inhibiting vibrations of the vibrating body, whereby the speed, the thrust force, the efficiency, and the temperature stability of the vibrating body are improved. Further, since a joint member for coupling to a holding member can be eliminated from the vibrating body, the shape of the vibrating body is simplified, which reduces the number of unnecessary vibration modes and also improves the mass productivity of components.

In the vibration actuator of the above conventional example, however, if the thrust force is further improved, the vibrating body may move relative to a holding member, which results in unstable driving of the vibration actuator. More specifically, the thrust force of the vibration actuator is increased with an improvement in the coefficient of friction between the vibrating body and a driving target body. Meanwhile, the pressure force acting between a holding member and the vibrating body does not change, which means that the frictional force between the holding member and the vibrating body does not change, either. As a result, the value of the maximum static frictional force between the holding member and the vibrating body is small relative to the increased thrust force of the vibration actuator, which causes the vibrating body to move with respect to the holding member. This may result in unstable driving of the vibration actuator.

SUMMARY

The present disclosure is directed to providing a vibration actuator and a driving device that stably achieve driving with a high thrust force.

According to an aspect of the present disclosure, a vibration actuator includes a vibrating body configured to include an electro-mechanical energy conversion element and an elastic body and have two vibration modes having a common node area that is of both the two vibration modes and is shared between the two vibration modes, a contact body configured to come into contact with the elastic body, and an abutment body configured to include an abutment member that abuts on the common node area on a side opposite to a side on which the abutment body faces the contact body, wherein the vibration actuator is configured such that an attraction force between the vibrating body and the abutment body is generated by a magnetic force.

Further features of the present disclosure will become apparent from the following description of exemplary embodiments with reference to the attached drawings.

DESCRIPTION OF THE EMBODIMENTS

Figure 1:
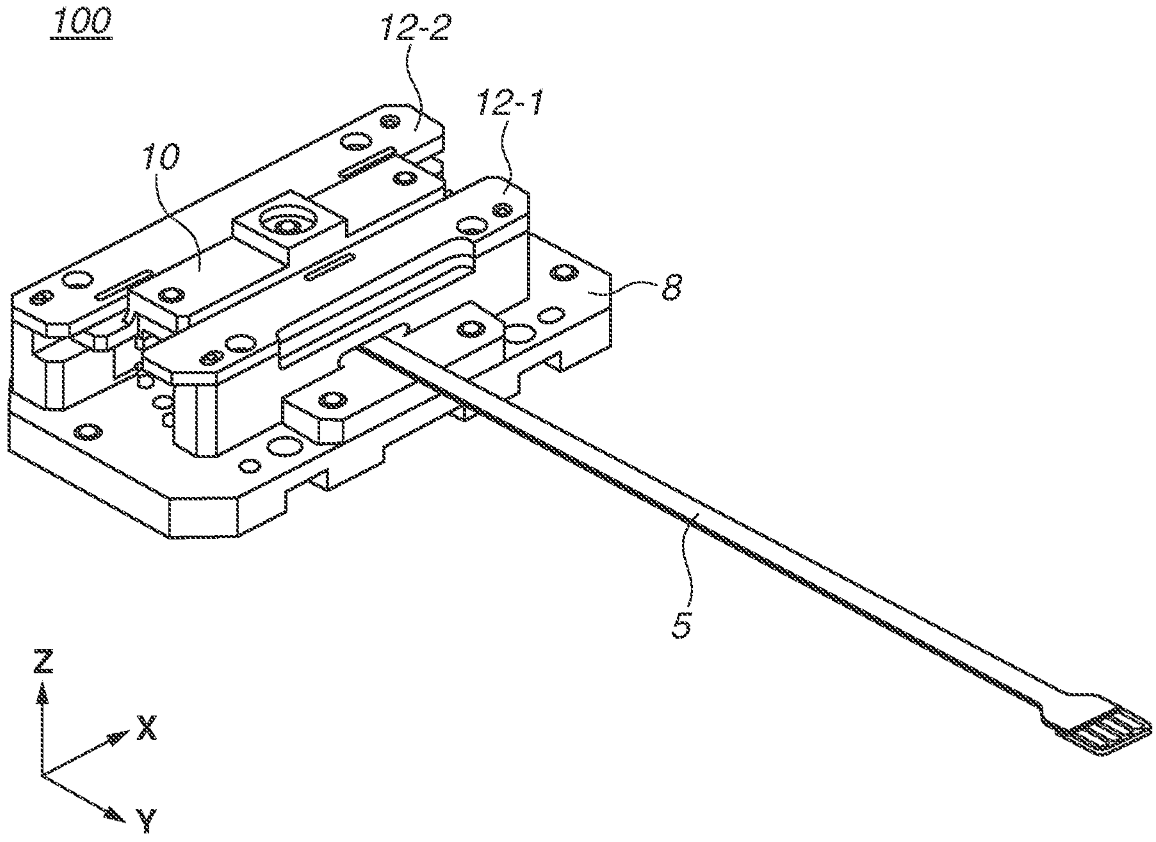
FIG. 1 is a perspective view illustrating a general configuration of a vibration actuator according to a first exemplary embodiment.

Hereinafter, preferred embodiments to which the present disclosure can be applied will be described in detail with reference to the drawings. In the following description and drawings, common components are denoted by common reference numerals throughout the drawings, and thus the common components will be described with reference to the drawings, and description of the components denoted by the common reference numerals will be omitted as appropriate.

First, a first exemplary embodiment is described.

[Basic Configuration of Vibration Actuator]

Figure 2:
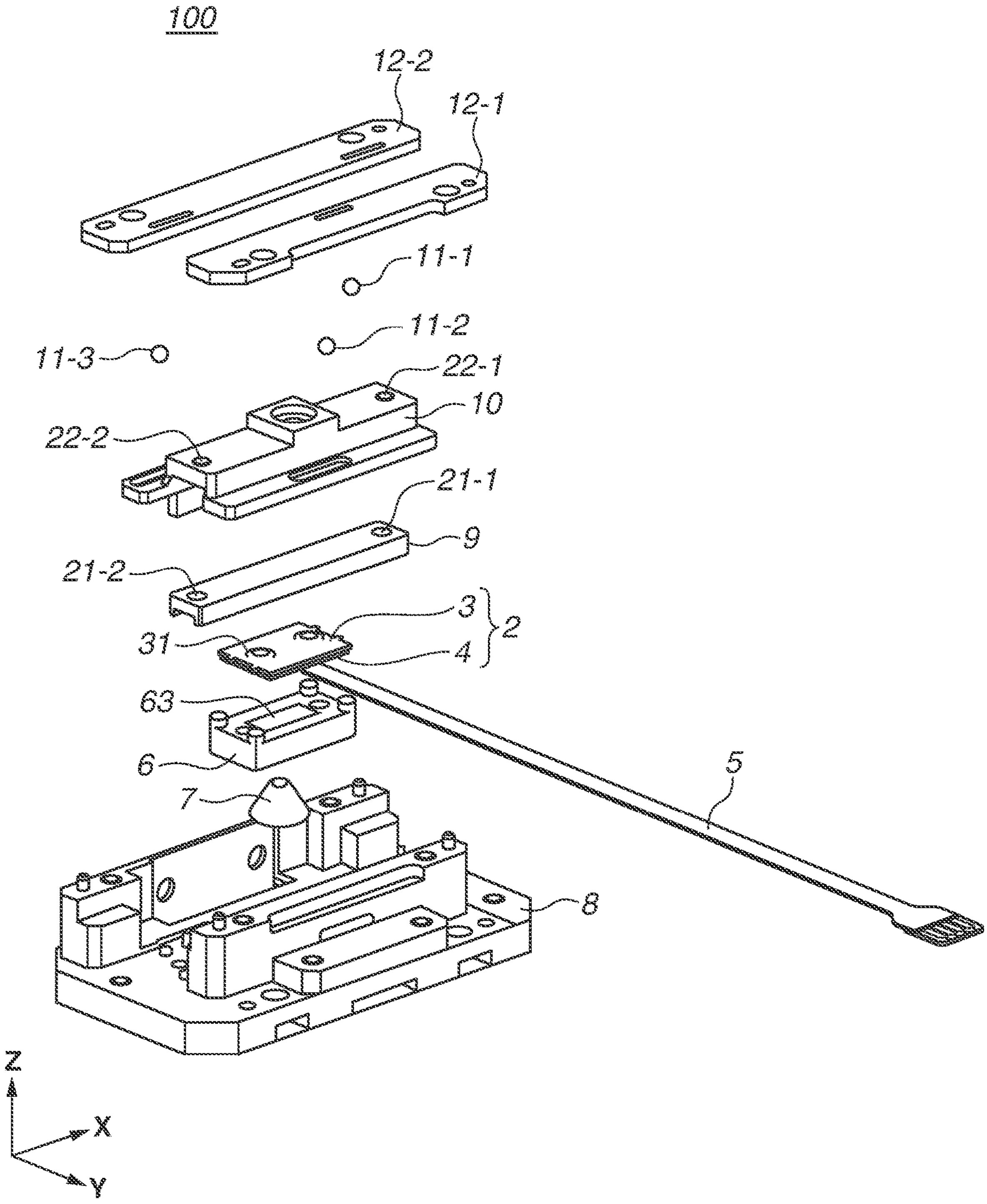
FIG. 2 is an exploded perspective view illustrating the vibration actuator according to the first exemplary embodiment.

FIG. 1 is a perspective view illustrating a general configuration of a vibration actuator 100 according to the first exemplary embodiment. FIG. 2 is an exploded perspective view illustrating the vibration actuator 100 according to the first exemplary embodiment. The moving direction of a contact body 9 is defined as an X-direction, the pressure direction of the contact body 9 is defined as a Z-direction, and a direction perpendicular to the X-direction and the Z-direction is defined as a Y-direction.

The vibration actuator 100 includes a vibrating body 2 including an electro-mechanical energy conversion element 4 and an elastic body 3. The vibration actuator 100 also includes a contact body 9 that comes into contact with the elastic body 3, and an abutment body 6 (holding member 6) including abutment members 61 (protrusion members 61) that abut on node areas in the vibrating body 2 on a surface of the vibrating body 2 opposite to the other surface facing the contact body 9. The vibration actuator 100 is configured such that an attraction force by a magnetic force is generated between the vibrating body 2 and the abutment body 6. The abutment members 61 each have a form protruding toward the vibrating body 2 from the abutment body 6 to locally abut on predetermined regions (node areas) of the vibrating body 2, and therefore are occasionally referred to also as the protrusion members 61.

Because the abutment body 6 holds the orientation of the vibrating body 2 by abutting on the node areas in the vibrating body 2, the abutment body 6 is sometimes referred to also as the holding member 6. Holding the orientation of the vibrating body 2 corresponds to the state where, in regard to the time-averaged position of the vibrating body 2 excited to translationally move, variations in the angle of deviation in each of the roll direction, the yaw direction, and the pitch direction of the vibrating body 2 are reduced relative to the pressure direction of the vibrating body 2 by the abutment of the abutment members 61. In other words, holding the orientation of the vibrating body 2 corresponds to the state where, in regard to the time-averaged position of the vibrating body 2 excited to translationally move, variations are reduced in the angle of deviation in each of the yaw direction, the pitch direction, and the roll direction of the vibrating body 2 relative to the moving direction of the translational movement.

The vibrating body 2 includes the elastic body 3, the electro-mechanical energy conversion element 4 disposed on one of main surfaces (back surface in this case) of the elastic body 3, and a flexible printed circuit board 5 fixed to a main surface of the electro-mechanical energy conversion element 4 opposite to the other main surface on which the elastic body 3 is disposed. On the main surface of the elastic body 3 opposite to the other main surface on which the electro-mechanical energy conversion element 4 is disposed, two protruding members 31 (31-1 and 31-2) are disposed. Although the two protruding members 31-1 and 31-2 are illustrated as the protruding members 31 in the example in FIG. 2, the contact body 9 can be driven with at least one protruding member 31.

As an example, the elastic body 3 has an approximately rectangular and flat plate-like shape and is an elastic member made of a magnetic metal. As the material of the magnetic metal, for example, martensitic stainless steel is used. It is desirable that the elastic body 3 should have been subjected to, for example, quenching treatment as hardening treatment for increasing the durability. The protruding members 31 are each formed with a thickness having spring properties and are formed integrally with the elastic body 3, for example, by pressing a plate material forming the elastic body 3. The present disclosure, however, is not limited to this. The protruding members 31 may be fixed to the elastic body 3 by welding. Because the ends (the upper surface) of the protruding members 31 slide in frictional contact with the contact body 9, it is desirable that the protruding members 31 should have been subjected to hardening treatment, such as quenching treatment to increase abrasion resistance.

The electro-mechanical energy conversion element 4 has the function of converting an electrical quantity into a mechanical quantity and is fixed to the elastic body 3. As the electro-mechanical energy conversion element 4, a piezoelectric element can be suitably used. The electro-mechanical energy conversion element 4 is bonded to the elastic body 3 by an adhesive, for example. The piezoelectric element as the electro-mechanical energy conversion element 4 has a structure where electrodes having predetermined shapes are formed on both sides of a plate-like piezoelectric ceramic.

To the electrodes of the electro-mechanical energy conversion element 4, a driving voltage (an alternating-current voltage) at a predetermined frequency is applied from the flexible printed circuit board 5.

In the present exemplary embodiment, either one of the contact body 9 and the abutment body 6 includes an output side joint member joined to a driving target body, and the other of the contact body 9 and the abutment body 6 includes a base material side joint member joined to a base material serving as a reference for driving the driving target body. Details of this point will be described below.

In a configuration in which the contact body 9 includes the output side joint member, and the abutment body 6 includes the base material side joint member, the vibrating body 2 is fixed in the vibration actuator 100, and the contact body 9 is moved relative to the vibrating body 2 that is fixed.

As illustrated in FIG. 2, the contact body 9 is disposed in contact with the protruding members 31 of the elastic body 3. The contact body 9 is joined to a contact body holder 10. As an example, threaded holes 21 (21-1 and 21-2) are formed in the contact body 9, and threaded holes 22 (22-1 and 22-2) are formed in the contact body holder 10. In the state where the positions of the threaded holes 21-1 and 22-1 match each other, and the positions of the threaded holes 21-2 and 22-2 match each other, predetermined screws are engaged with the threaded holes 21-1 and 22-1 and the threaded holes 21-2 and 22-2, fastening the contact body 9 to the contact body holder 10.

In the above-described case, the contact body holder 10 serves as the driving target body, and the threaded holes 21 of the contact body 9 serve as the output side joint member. Instead of fastening with screws, the contact body 9 may be joined to the contact body holder 10 by an adhesive or welding. In this case, the part of the contact body 9 to which the adhesive has been applied or the welded part of the contact body 9 serves as the output side joint member. The contact body 9 is driven integrally with the contact body holder 10 in the X-direction. A vibration absorption member for attenuating vibrations may be disposed between the contact body 9 and the contact body holder 10. Examples of the vibration absorption member include a rubber having a predetermined thickness. It is desirable that a material of the contact body 9 should be a metal, a ceramic, or a resin with high abrasion resistance, or a composite material of these. Particularly, a material obtained by nitriding stainless steel, such as SUS420J2, is desirable in terms of abrasion resistance and mass productivity.

On a side of the vibrating body 2 on which the electro-mechanical energy conversion element 4 is disposed, the abutment body 6 including the abutment members 61 that abut on the vibrating body 2 is disposed. Examples of the method for pressurizing the vibrating body 2 include a pressure spring 7. The pressure spring 7 applies a pressure force to the abutment body 6 in the Z-direction. A base 8 as a pressure reception member receives a reaction force of the pressure force. It is desirable to employ a cone coil spring as the pressure spring 7 to miniaturize the vibration actuator 100 in the Z-direction. The shape of the coil is illustrated in a simplified manner in FIG. 2. The pressure spring 7 applies a predetermined pressure force, e.g., a pressure force of about 300 gram-force (gf) in the present exemplary embodiment, to the vibrating body 2. The abutment body 6 abuts on the vibrating body 2 while pressurizing the vibrating body 2.

On two longitudinal surfaces of the contact body holder 10, two ball rails 12-1 and 12-2 for holing three balls 11-1, 11-2, and 11-3 thereunder are disposed. In this configuration, the ball rails 12 are fixed to the base 8, and the contact body 9 and the contact body holder 10 can move in the X-direction relative to other components. With an output transmission member having a certain shape disposed to the contact body holder 10, an output is transmitted to outside.

In a configuration in which the abutment body 6 includes the output side joint member, and the contact body 9 includes the base material side joint member, the contact body 9 is fixed in the vibration actuator 100, and the vibrating body 2 is moved relative to the fixed contact body 9. In this case, in FIG. 2, the base 8 serves as the driving target body, and the contact body holder 10 serves as the base material.

[Vibration Modes Induced in Vibrating Body]

Figure 3:
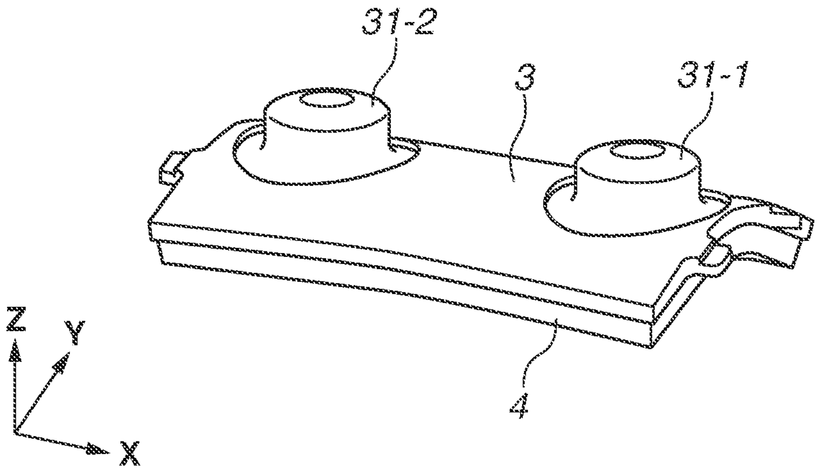
FIG. 3 is a perspective view illustrating excited vibration modes of a vibrating body of the vibration actuator according to the first exemplary embodiment.
Figure 3:
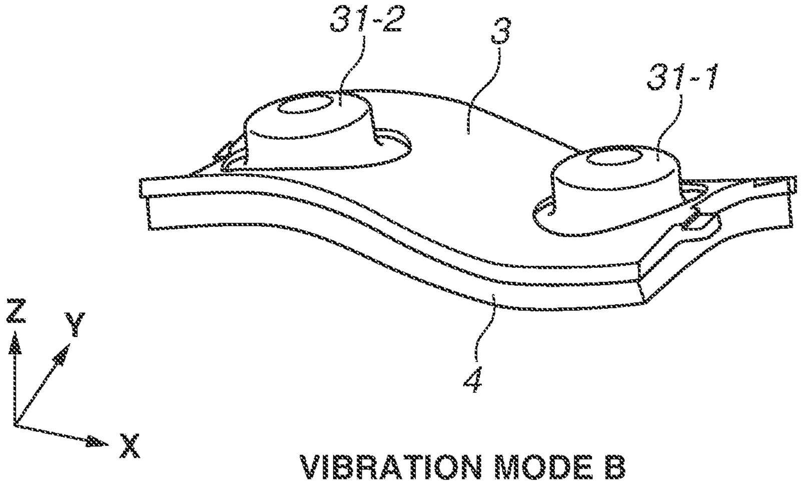

Next, with reference to FIG. 3, vibration modes induced in the vibrating body 2 are described. In the present exemplary embodiment, an alternating-current voltage is applied to the electro-mechanical energy conversion element 4 via the flexible printed circuit board 5 to induce out-of-plane bending vibrations in two different vibration modes in the vibrating body 2, and a vibration obtained by combining these vibrations is generated. These vibration modes include two vibration modes having a common node area that is of both the two vibration modes and is shared between the two vibration modes. Vibration modes A and B similar to those according to the present exemplary embodiment further include unique node areas that are of the respective vibration modes A and B and different between the vibration modes A and B.

The vibration mode A as a first vibration mode is a first-order out-of-plane bending vibration mode with two nodes located on both sides of the protruding members 31-1 and 31-2 in parallel in the X-direction, which is the longitudinal direction of the vibrating body 2. In a vibration in the vibration mode A, the protruding members 31-1 and 31-2 at two positions are displaced in the Z-direction, which is the pressure direction. The vibration mode B as a second vibration mode is a second-order out-of-plane bending vibration mode with three nodes located approximately parallel in the Y-direction, which is the short direction of the vibrating body 2. In a vibration in the vibration mode B, the protruding members 31-1 and 31-2 at the two positions are displaced in the X-direction. The vibration mode B is not limited to a second-order vibration mode, and can also be an N-th order vibration mode (N is 1 or an integer greater than or equal to 3).

The vibrations in the vibration modes A and B are combined together, whereby the protruding members 31-1 and 31-2 at the two positions perform elliptical motions or circular motions in the ZX plane. Bringing the contact body 9 into contact with the protruding members 31-1 and 31-2 generates a frictional force in the X-direction, and a driving force (thrust force) to move one of the vibrating body 2 and the contact body 9 relative to the other is generated. In the present exemplary embodiment, since the vibrating body 2 is held by a technique described below, the contact body 9 moves in the X-direction. A configuration in which the position of the contact body 9 is fixed by a predetermined fixing member to cause the vibrating body 2 to move in the X-direction can also be employed.

Figure 4:
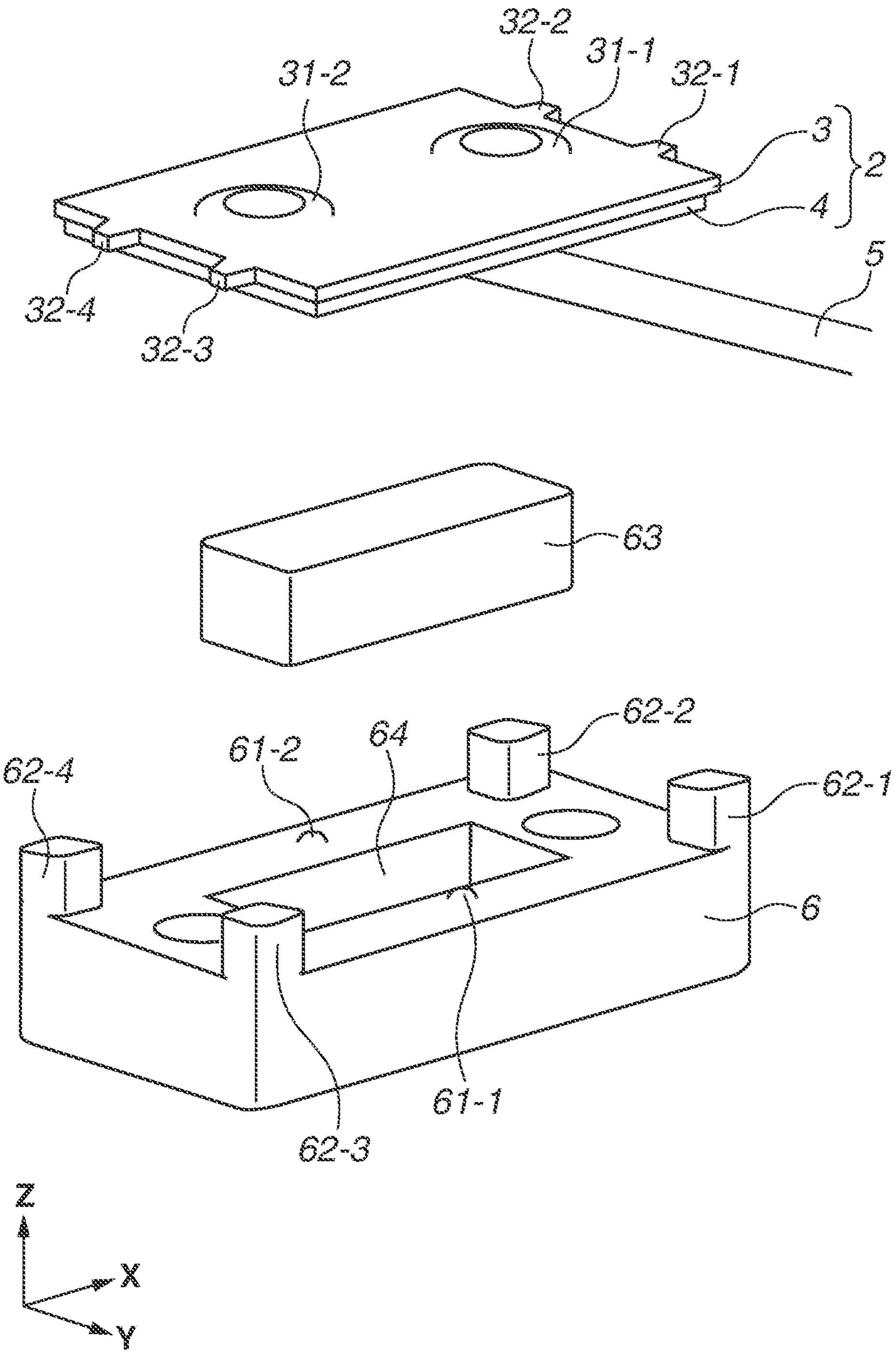
FIG. 4 is an exploded perspective view illustrating the vibrating body and a holding member of the vibration actuator according to the first exemplary embodiment.
Figure 6:
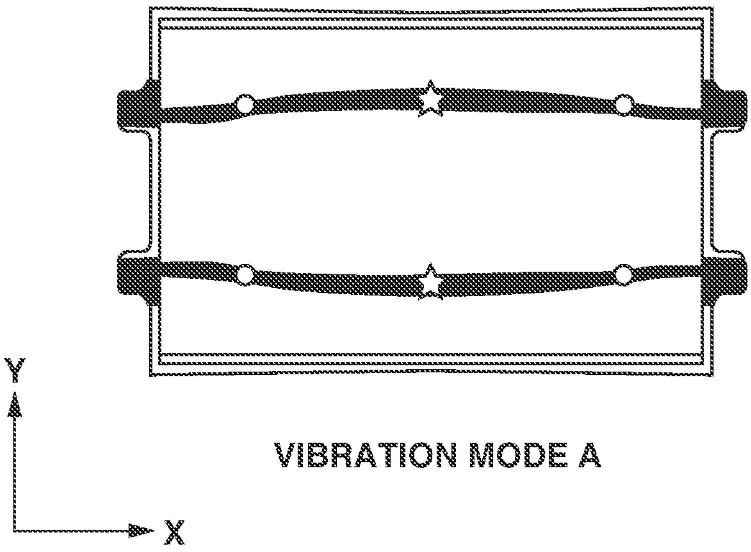
FIG. 6 is a plan view illustrating node areas in the vibrating body of the vibration actuator according to the first exemplary embodiment.
Figure 6:
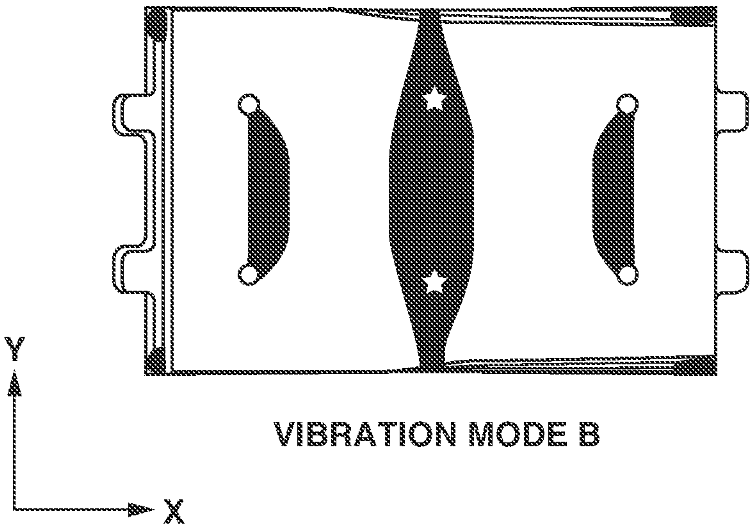

To efficiently drive the vibration actuator 100, it is necessary to support the vibrating body 2 without inhibiting the vibrations (displacement) in the two vibration modes A and B induced in the vibrating body 2. More specifically, to efficiently drive the vibration actuator 100, supporting a common area between the node areas of the vibration mode A and the node areas of vibration mode B is desirable. This form is sometimes referred to also using the expression that the abutment body 6 efficiently supports the vibrating body 2. For this reason, to pressurize and hold the common node area between the two vibration modes induced in the vibrating body 2, two abutment portions, i.e., the abutment members 61-1 and 61-2 are disposed in the abutment body 6 serving as an abutment body of the vibrating body 2 as illustrated in FIG. 4. FIG. 6 illustrates the contact positions of the abutment members 61-1 and 61-2 and the node areas in the vibration modes A and B. For simplicity, the flexible printed circuit board 5 is omitted from FIG. 6. A mode having a common node area between the two vibration modes A and B is sometimes referred to also as a mode having an area where the node areas in the two vibration modes A and B overlap each other.

That is, in the two vibration modes A and B of the vibrating body 2 according to the present exemplary embodiment, some node areas are at unique locations corresponding to one of the vibration modes, some other node areas are at unique locations corresponding to the other vibration mode, and the other node areas are at common locations corresponding to both the vibration modes, as illustrated in FIG. 6. In other words, as illustrated in FIG. 6, the two vibration modes A and B of the vibrating body 2 according to the present exemplary embodiment have unique node areas that are of the respective vibration modes A and B and different between the vibration modes A and B, and the common node areas that are of both the vibration modes A and B and are shared between the vibration modes A and B.

In FIG. 6, blacked-out portions indicate node areas including vibration nodes. Specifically, the area in which about 35% or less of the maximum displacement is produced in the two vibration mode is defined as a node area, and the area is indicated in black. When the vibration modes A and B are superimposed on each other, six locations where the blacked-out portions overlap each other, i.e., six common node areas (circles at four locations and stars at two locations), are located. Among the six common node areas, the two locations indicated by stars are desirable to be used as positions where the vibrating body 2 is further efficiently supported. Among the locations of intersection between the first-order out-of-plane bending vibration mode A where two node areas are located in the longitudinal direction of the elastic body 3, and the second-order out-of-plane bending vibration mode B where three node areas are located in the short direction of the elastic body 3, the stars at two locations indicate two points in the middle of the three node areas. In the present exemplary embodiment, the blacked-out portions other than the six common node areas (the circles at four locations and the stars at two locations) correspond to the unique node areas that are of the respective vibration modes A and B and different between the vibration modes A and B.

Firstly, the two locations indicated by the stars have less displacement than the four locations indicated by the circles. Secondly, the vibrating body 2 is pressurized at a single point in the X-direction when viewed along the ZX cross section, functioning as an equalizer between the protruding members 31-1 and 31-2 and the contact body 9 about the Y-axis, whereby the contact between the protruding members 31-1 and 31-2 and the contact body 9 is equalized. For these reasons, the abutment members 61-1 and 61-2 are configured to be in contact with the positions of the stars at two locations in the abutment body 6 as illustrated in FIG. 6, which improves efficient pressurization of the vibrating body 2.

[Attraction Force by Magnetic Force Generated between Vibrating Body and Holding Member]

Figure 5:
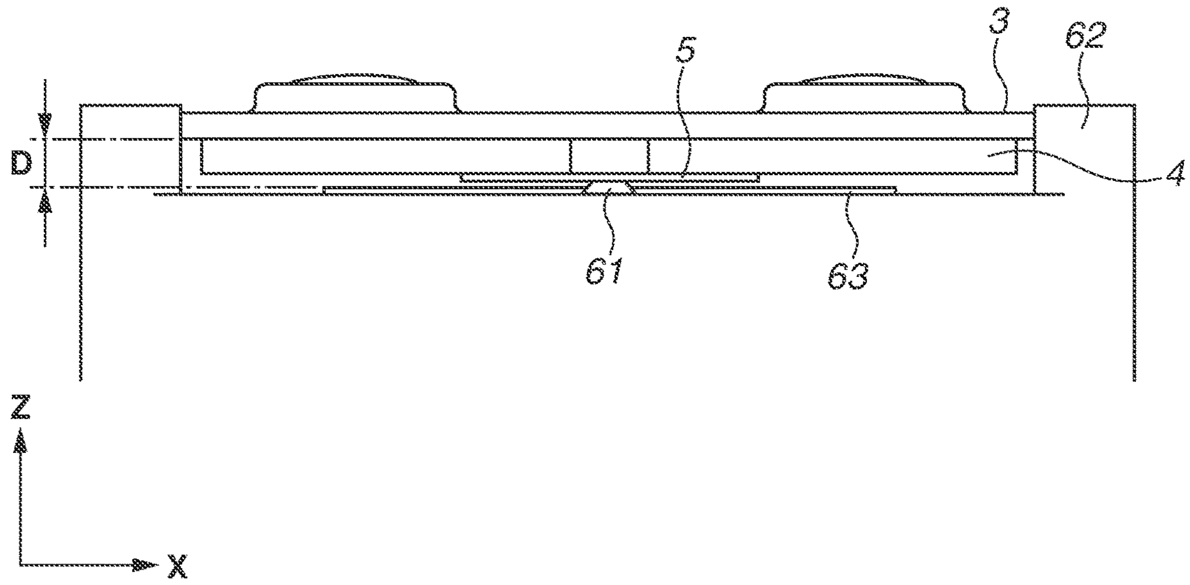
FIG. 5 is a side view illustrating the vibrating body and the holding member of the vibration actuator according to the first exemplary embodiment.

FIG. 5 is an enlarged side view of the vibrating body 2 and the abutment body 6 when viewed from the Y-direction.

In the vibration actuator 100, an attraction force by a magnetic force is generated between the vibrating body 2 and the abutment body 6 serving as an abutment body of the vibrating body 2. Either one of the vibrating body 2 and the abutment body 6 includes a magnetic body, and the other of the vibrating body 2 and the abutment body 6 includes a magnet that applies an attraction force to the magnetic body. In the present exemplary embodiment, the elastic body 3 of the vibrating body 2 has a magnetic body formed of martensitic stainless steel, and the abutment body 6 has a magnet that applies an attraction force to the elastic body 3. The magnet or the magnetic body is placed in a central portion of the abutment body 6, and the elastic body 3 is placed on the abutment body 6 such that the positions of the elastic body 3 and the magnet or the magnetic body match each other.

As an example, as illustrated in FIGS. 4 and 5, the elastic body 3 includes a magnetic body, and in the abutment body 6, a magnet hold portion 64 recessed from the level of the periphery is formed in the central portion of the abutment body 6, and a permanent magnet 63 in a cuboid is inserted into and fixed to the magnet hold portion 64. Examples of the permanent magnet 63 include a ferrite magnet and a neodymium magnet. Particularly, the neodymium magnet, which has a strong magnetic force, is suitably used. The permanent magnet 63 is fixed to the abutment body 6 in the magnet hold portion 64 by an adhesive, for example.

The permanent magnet 63 is disposed such that one of the magnetic poles, namely the south (S) pole and the north (N) pole, of the permanent magnet 63 is directed approximately parallel to the Z-direction, which is the pressure direction of the elastic body 3 and the contact body 9. The vibrating body 2 and the abutment body 6 pull each other in the Z-direction by the magnetic action of the permanent magnet 63. Thus, the attraction force of the permanent magnet 63 acts together with the pressure force of the pressure spring 7 between the vibrating body 2 and the abutment body 6. With this configuration, in comparison to a comparative configuration in which a vibrating body is held only by a pressure force, it is possible to significantly increase the maximum static frictional force acting between the flexible printed circuit board 5 of the vibrating body 2 and the abutment members 61 of the abutment body 6. This maximum static frictional force is greater than the thrust force generated in the contact body 9, which causes the vibrating body 2 to be significantly prevented from moving relative to the abutment body 6 while the vibration actuator 100 is driven.

Regarding the position of the permanent magnet 63 in the Z-direction, it is desirable to minimize a distance D between the permanent magnet 63 and the elastic body 3, which improves the attraction force by the magnetism to act on the elastic body 3. On the other hand, if the permanent magnet 63 is brought too close to the elastic body 3, the vibrating body 2 and the permanent magnet 63 may interfere with each other due to the above-described equalization about the Y-axis. Accordingly, in the present exemplary embodiment, as illustrated in FIG. 5, the position of the permanent magnet 63 in the Z-direction is such that the permanent magnet 63 does not protrude further toward the vibrating body 2 than the abutment members 61 in the Z-direction.

The permanent magnet 63 is disposed in the abutment body 6 such that the center position of the permanent magnet 63 in the X-direction matches the center position of the elastic body 3 of the vibrating body 2 in the X-direction. In the present exemplary embodiment, since the abutment members 61 of the abutment body 6 are disposed in the center of the abutment body 6 in the X-direction, the center position in the X-direction of the permanent magnet 63 also matches the positions of the abutment members 61 in the X-direction. With this configuration, the attraction forces acting on the elastic body 3 are the same on the both sides of the center of the elastic body 3 in the X-direction, which prevents rotation of the vibrating body 2 about the Y-axis and causes the vibrating body 2 to be attracted toward the abutment body 6 in the Z-direction. Thus, even in a state where the vibrating body 2 and the abutment body 6 are attracted by the permanent magnet 63, the contact body 9 can be stably moved relative to the vibrating body 2 with the vibrating body 2 being not tilted about the Y-axis relative to the contact body 9.

Further, the permanent magnet 63 is disposed in the abutment body 6 in such a manner that the center position of the permanent magnet 63 in the Y-direction matches the center position of the elastic body 3 in the Y-direction. In the present exemplary embodiment, the permanent magnet 63 is disposed between the two abutment members 61 of the abutment body 6 in the Y-direction. With this configuration, the attraction forces acting on the elastic body 3 are the same on both sides of the center of the elastic body 3 in the Y-direction, which prevents rotation of the vibrating body 2 about the X-axis and causes the vibrating body 2 to be attracted toward the abutment body 6 perpendicularly to the Z-direction, whereby stable driving is achieved.

The size of the permanent magnet 63 in the Z-direction is set such that the permanent magnet 63 does not protrude downward from the level of the bottom surface in the Z-direction of the abutment body 6, which is the surface opposite to the surface on which the magnet hold portion 64 is disposed. Thus, the permanent magnet 63 is disposed between the vibrating body 2 and the abutment body 6 in the Z-direction, and the permanent magnet 63 is disposed without increasing the size of the abutment body 6 in the Z-direction.

With the above described configuration, increase in size of the vibration actuator 100 can be avoided. If there is room in the size of the vibration actuator 100, the present disclosure is not limited to this. The permanent magnet 63 of larger size in the Z-direction may be used and protrude downward from the abutment body 6 in the Z-direction, to further improve the attraction force. In other words, the abutment body 6 has a magnet hold structure 64 that holds the permanent magnet 63.

In the present exemplary embodiment, as an example, the force pulling the vibrating body 2 and the abutment body 6 each other by the permanent magnet 63 is about 106 gf when it is calculated based on the size of the permanent magnet 63 and the distance between the permanent magnet 63 and the elastic body 3. Thus, in this case, a force of about 406 gf obtained by combining about 106 gf and about 300 gf as an example of the pressure force of the pressure spring 7 acts on the vibrating body 2 and the abutment body 6 in the Z-direction. Compared to a comparative configuration in which a vibrating body is held only by a pressure force, the frictional force between the vibrating body 2 and the abutment body 6 is improved by about 35%. Thus, even in a case where the coefficient of friction of the contact body 9 is improved, and the thrust force generated in the vibration actuator 100 is increased, a relative movement does not occur between the vibrating body 2 and the abutment body 6, whereby stable driving of the vibration actuator 100 can be achieved. Since forces are applied in a non-contact manner by magnetism, the frictional force between the vibrating body 2 and the abutment body 6 can be improved without inhibiting the vibration of the vibrating body 2.

If the contact body 9 includes a magnetic material, such as martensitic stainless steel, the permanent magnet 63 and the contact body 9 may pull each other, albeit slightly, and the pressure force between the vibrating body 2 and the contact body 9 may increase. However, the distance between the contact body 9 and the permanent magnet 63 in the Z-direction is greater than the distance between the vibrating body 2 and the permanent magnet 63 in the Z-direction. Thus, the force pulling the permanent magnet 63 and the contact body 9 each other is very weaker than the force of the permanent magnet 63 and the vibrating body 2 pulling each other. In the present exemplary embodiment, as an example, the force of the contact body 9 and the abutment body 6 pulling each other is about 17 gf when it is calculated based on the size of the permanent magnet 63 and the distance between the permanent magnet 63 and the contact body 9. In this case, the influence of the pulling force of about 17 gf increases only by about 5% relative to a pressure force of about 300 gf. This force does not influence the motor performance, and the durability does not deteriorate, either.

On the outer peripheral surface of the elastic body 3 of the vibrating body 2, at least two extending portions 32 are provided. In this case, two extending portions 32 on each short side of the outer peripheral surface, i.e., four extending portions 32 (32-1, 32-2, 32-3, and 32-4), are disposed.

The extending portions 32 extend in the X-direction from the locations of the node areas of the vibration mode A to minimize the vibration displacement. At the four corners of the abutment body 6, engagement portions 62 (62-1, 62-2, 62-3, and 62-4) are disposed. The extending portions 32 and the engagement portions 62 are in contact with each other with clearances therebetween. The vibrating body 2 is supported in a loose fitting manner by the abutment body 6. The engagement portions 62 function as an alignment member of the vibrating body 2 in assembly.

The engagement portions 62 may be in contact with two areas different from the vibration node areas on the outer peripheral surface of the vibrating body 2. In the present exemplary embodiment, however, as described above, the maximum frictional force generated between the flexible printed circuit board 5 and the abutment members 61-1 and 61-2 is greater than the thrust force generated in the contact body 9. This means that forces in the X-direction and the Y-direction do not act on contact portions between the engagement portions 62 and the vibrating body 2. Consequently, loss in this case is negligible, and a driving issue does not arise.

In the present exemplary embodiment, the abutment members 61 of the abutment body 6 and predetermined node areas of the vibrating body 2 come into direct contact with each other, and the engagement portions 62 of the abutment body 6 and the outer peripheral surface of the vibrating body 2 come into direct contact with each other. Thus, it is desirable that the material of the abutment body 6 should be a resin having high vibration insulation properties to prevent occurrence of abnormal noises. For the above-described reason, it is desirable that the coefficient of friction of the abutment members 61 should be high to increase the force to hold the vibrating body 2. On the other hand, however, it is desirable that the coefficient of friction of the engagement portions 62 should be small to further reduce friction loss with the vibrating body 2. For these reasons, coating for increasing the coefficient of friction may be applied to the abutment members 61, and conversely, coating for decreasing the coefficient of friction may be applied to the engagement portions 62. Another component having a coefficient of friction suitable for each of the abutment members 61 and the engagement portions 62 can also be included by adhesion or formed by press fit.

As described above, in the present exemplary embodiment, the permanent magnet 63 is disposed in the abutment body 6, and the pressure force and the attraction force of the permanent magnet 63 are caused to act together between the vibrating body 2 including a magnetic body and the abutment body 6, whereby the abutment body 6 holds the vibrating body 2. With this configuration, in comparison to a comparative configuration in which a vibrating body is held only by a pressure force, movement of the vibrating body 2 relative to the holding member 6 is significantly inhibited, whereby the vibration actuator 100 that performs stable driving is achieved.

In the vibration actuator 100 according to the present exemplary embodiment, the method for generating elliptical motions or circular motions of the protruding members 31 on the contact surface of the vibrating body 2 (the elastic body 3) with the contact body 9 is not limited to the above method. For example, vibrations in out-of-plane bending (lateral) vibration modes different from those described above may be combined together, or a vibration in a longitudinal vibration mode where the elastic body 3 is caused to expand and contract in the longitudinal direction and a vibration in an out-of-plane bending (lateral) vibration mode may be combined together. Vibration modes for the vibrating body 2 (elastic body 3) include two vibration modes having a common node area that is of both the vibration modes and is shared between the vibration modes. These two vibration modes may include unique node areas that are of the respective vibration modes and different between the vibration modes. In the present exemplary embodiment, a vibration mode where a contact surface is displaced in a pressure direction and a vibration mode where the contact surface is displaced in the moving direction of a driving target body are combined together. Any driving method may be used as long as the method generates elliptical motions or circular motions on the contact surface based on this combination, and the vibrating body 2 (elastic body 3) includes a common node area for pressurization and holding.

The abutment body 6 (holding member 6) according to the present exemplary embodiment is usable with two vibration modes having a common node area and each further having a unique node area as described above among a plurality of vibration modes including high-order (an order N) vibration modes presented by the vibrating body 2.

In the present exemplary embodiment, the descriptions have been given of a case where the elastic body 3 includes a magnetic body, and the permanent magnet 63 is disposed in the abutment body 6. The present disclosure, however, is not limited to this. As an example, a configuration in which the elastic body 3 is formed of a permanent magnet, or a permanent magnet is placed in the elastic body 3, and a magnetic body is placed in at least a part, such as the central portion, of the abutment body 6 may be employed so that the attraction force by a magnetic force is generated between the vibrating body 2 and the abutment body 6. In this case, similarly to the present exemplary embodiment, two protruding members 31 are disposed in the elastic body 3, and two abutment members 61 are disposed in the abutment body 6. On the outer peripheral surface of the elastic body 3, four extending portions 32 are disposed. The elastic body 3 including the permanent magnet is a thin plate-like member or a film-like member. In a part of the abutment body 6, a thin magnetic body may be disposed. With this configuration, increase in size of the abutment body 6 can be avoided, and the miniaturization of the vibration actuator 100 can be achieved in combination with the thin plate-like or film-like elastic body 3.

As an example illustrated in the present exemplary embodiment, the pressure force is about 300 gf, and the attraction force by the magnetism of the permanent magnet is about 106 gf. The present disclosure, however, is not limited to these. The pressure force and the attraction force of the permanent magnet may be appropriately adjusted according to the performance required for the vibration actuator.

Modification Examples

Figure 7A:
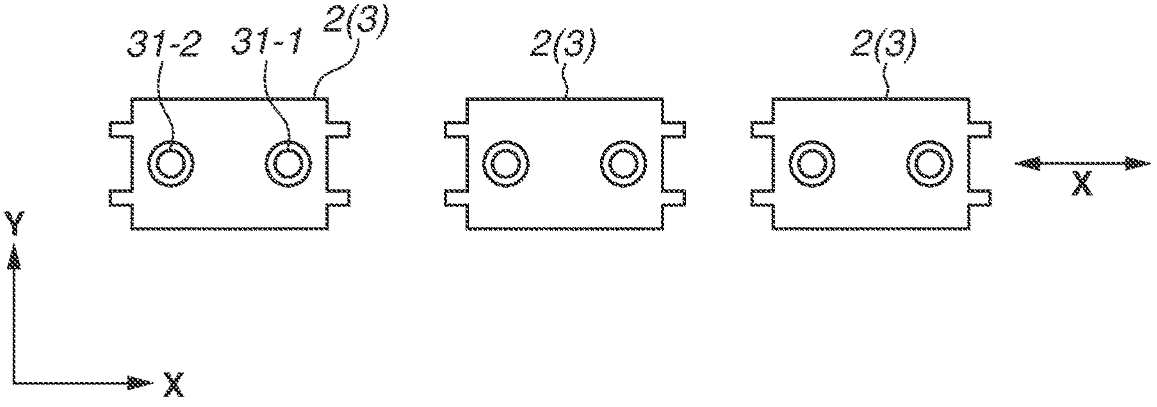
FIGS. 7A, 7B, and 7C are plan views illustrating modification examples of the vibration actuator according to the first exemplary embodiment in a simplified manner.
Figure 7B:
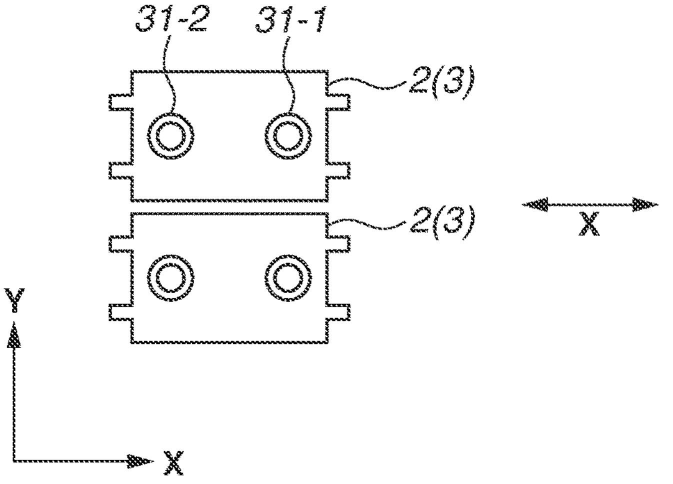
Figure 7C:
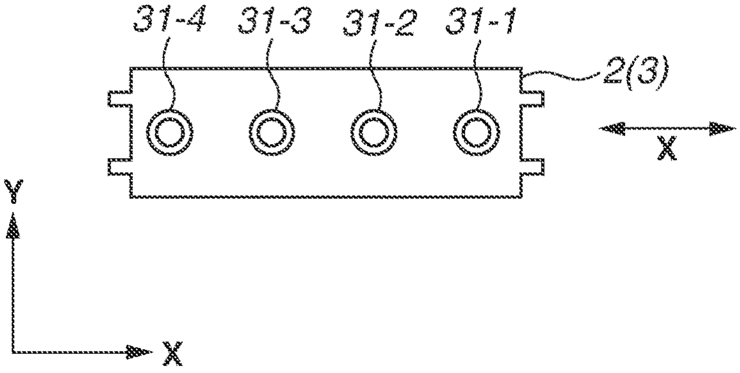

Modification examples of the vibration actuator 100 according to the first exemplary embodiment are described below. In the present exemplary embodiment, the vibration actuator 100 in which a single vibrating body (vibrating body 2) including the elastic body 3 having two protruding members 31 on the surface is disposed has been discussed. The present disclosure, however, is not limited to this. The following modification examples illustrate cases where a plurality of vibrating bodies 2 is disposed and a case where three or more protruding members 31 are disposed in an elastic body 3 of a vibrating body 2. FIGS. 7A, 7B, and 7C are plan views illustrating the modification examples of the vibration actuator according to the present exemplary embodiment in a simplified manner. FIGS. 7A, 7B, and 7C illustrate only vibrating bodies.

First Modification Example

FIG. 7A is a plan view illustrating vibrating bodies of a vibration actuator according to a first modification example.

In the first modification example, a description is given of a case where the vibration actuator includes a plurality of vibrating bodies 2, e.g., three vibrating bodies 2 in this case, and the vibrating bodies 2 are disposed in series. Four or more vibrating bodies 2 may be arranged in series.

Similarly to the present exemplary embodiment, as an example, elastic bodies 3 of the three vibrating bodies 2 each include a magnetic body, and abutment bodies 6 corresponding to the vibrating bodies 2 each include a permanent magnet 63. In the first modification example, a contact body 9 is disposed to correspond to each one of the vibrating bodies 2 (three contact bodies 9 are disposed), or a single contact body 9 common to the three vibrating bodies 2 is disposed. The three contact bodies 9 or the single common contact body 9 is fixed to a single common contact body holder 10. An abutment body 6 corresponding to each one of the vibrating bodies 2 is disposed (three abutment bodies 6 are disposed), or a single abutment body 6 common to the three vibrating bodies 2 is disposed. The three abutment bodies 6 or the single common abutment body 6 is fixed to a single common base 8. Two protruding members 31 are disposed in each one of the elastic bodies 3, and two abutment members 61 are disposed in each one of the abutment bodies 6 or the single common abutment body 6. On the outer peripheral surface of the elastic body 3, four extending portions 32 are disposed.

In the vibration actuator according to the first modification example, out-of-plane bending vibrations in two different vibration modes are induced in each one of the vibrating bodies 2 by applying an alternating-current voltage to an electro-mechanical energy conversion element 4, and a vibration obtained by combining these vibrations is generated. These vibration modes include two vibration modes having a common node area that is of both the vibration modes and is shared between the vibration modes. Vibration modes A and B similar to those according to the present exemplary embodiment further include unique node areas that are of the respective vibration modes A and B and different between the vibration modes A and B. Vibrations in the vibration modes A and B are combined together, which causes the protruding members 31-1 and 31-2 disposed at two positions in each of the vibrating bodies 2 to perform elliptical motions or circular motions in the ZX plane. Bringing the contact body 9 into contact with the protruding members 31-1 and 31-2 generates a frictional force in the X-direction, and a driving force (a thrust force) to move one of the vibrating body 2 and the contact body 9 relative to the other is generated. The vibration mode B may be a longitudinal vibration mode where the elastic body 3 is caused to expand and contract in the longitudinal direction, instead of the out-of-plane bending (lateral) vibration mode. In this case, as an example, the vibration mode B is a second-order lateral vibration mode with three node areas located approximately parallel in the Y-direction, which is the short direction of the vibrating body 2.

In the vibration actuator according to the first modification example, the permanent magnet 63 in each one of the abutment bodies 6 is disposed such that one of the magnetic poles of the permanent magnet 63 is directed in the Z-direction. The vibrating body 2 and the abutment body 6 pull each other in the Z-direction by the magnetic force of the permanent magnet 63. Consequently, the attraction force of the permanent magnet 63 acts together with the pressure force of a pressure spring 7 between the vibrating body 2 and the abutment body 6. In comparison to a comparative configuration in which a vibrating body is held only by a pressure force, the frictional force acting between a flexible printed circuit board 5 of the vibrating body 2 and the abutment members 61 of the abutment body 6 can be significantly increased.

In the first modification example, the three vibrating bodies 2 disposed in series vibrate in synchronization with each other. The entire driving force (thrust force) generated by the three vibrating bodies 2 is therefore approximately three times that in a case where a single vibrating body 2 is used as in the present exemplary embodiment. In addition, since the permanent magnet 63 is disposed with respect to each one of the three vibrating bodies 2, the entire attraction force generated by the three permanent magnets 63 is approximately three times that in a case where a single permanent magnet 63 is used as in the present exemplary embodiment. Thus, also in view of the entirety of the vibration actuator 100, the maximum static frictional force acting between the flexible printed circuit board 5 of the vibrating body 2 and the abutment members 61 of the abutment body 6 is greater than the thrust force generated in the contact body 9. This results in significant inhibition of movement of the vibrating body 2 relative to the holding member 6 in driving of the vibration actuator 100. As described above, according to the first modification example, the vibration actuator achieves exertion of a great driving force (thrust force) as an actuator and also significant inhibition of movement of the vibrating body 2 relative to the holding member 6, whereby the vibration actuator that performs stable driving is achieved.

In the first modification example, a configuration in which three vibrating bodies 2 are disposed in series has been illustrated. Alternatively, two or four or more vibrating bodies 2 may be disposed in series. In this case, when the number of vibrating bodies 2 is M (M is 2 or an integer greater than or equal to 4), the entire driving force (thrust force) generated by the vibrating bodies 2 and the entire attraction force generated by the permanent magnets 63 are both approximately N times those in a case where a single vibrating body 2 is used.

FIG. 7B is a plan view illustrating vibrating bodies of a vibration actuator according to a second modification example.

In the second modification example, a description is given of a case where the vibration actuator includes a plurality of vibrating bodies 2, e.g., two vibrating bodies 2 in this case, and the vibrating bodies 2 are disposed in parallel.

Similarly to the present exemplary embodiment, as an example, elastic bodies 3 of the two vibrating bodies 2 each include a magnetic body, and holding members 6 corresponding to the vibrating bodies 2 each include a permanent magnet 63. In the second modification example, a contact body 9 is disposed with respect to each one of the vibrating bodies 2 (two contact bodies 9 are disposed), or a single contact body 9 common to the two vibrating bodies 2 is disposed. The two contact bodies 9 or the single common contact body 9 is fixed to a single common contact body holder 10. An abutment body 6 corresponding to each one of the vibrating bodies 2 is disposed (two abutment bodies 6 are disposed), or a single abutment body 6 common to the two vibrating bodies 2 is disposed. The two abutment bodies 6 or the single common abutment body 6 is fixed to a single common base 8. Two protruding members 31 are disposed in each one of the elastic bodies 3, and two abutment members 61 are disposed in each one of the abutment bodies 6 or the single common abutment body 6. On the outer peripheral surface of the elastic body 3, four extending portions 32 are disposed.

In the vibration actuator according to the second modification example, out-of-plane bending vibrations in two different vibration modes are induced in each of the vibrating bodies 2 by applying an alternating-current voltage to an electro-mechanical energy conversion element 4, and a vibration obtained by combining these vibrations is generated. These vibration modes include two vibration modes having a common node area that is of both the vibration modes and is shared between the vibration modes. Vibration modes A and B similar to those according to the present exemplary embodiment further include unique node areas that are of the respective vibration modes A and B and different between vibration modes A and B. Vibrations in the vibration modes A and B are combined together, which causes the protruding members 31-1 and 31-2 at two positions in each of the vibrating bodies 2 to perform elliptical motions or circular motions in the ZX plane. Bringing the contact body 9 into contact with the protruding members 31-1 and 31-2 generates a frictional force in the X-direction, and a driving force (thrust force) to move the vibrating body 2 and the contact body 9 relative to each other is generated. The vibration mode B may be a longitudinal vibration mode where the elastic body 3 is caused to expand and contract in the longitudinal direction, instead of the out-of-plane bending (lateral) vibration mode. In this case, as an example, the vibration mode B is a second-order lateral vibration mode with three node areas located approximately parallel in the Y-direction, which is the short direction of the vibrating body 2, with respect to the protruding members 31-1 and 31-2 at two positions.

In the vibration actuator according to the second modification example, the permanent magnet 63 in each one of the abutment bodies 6 is disposed such that one of the magnetic poles of the permanent magnet 63 is directed in the Z-direction. The vibrating body 2 and the abutment body 6 pull each other in the Z-direction by the magnetic action of the permanent magnet 63. Consequently, the attraction force of the permanent magnet 63 acts together with the pressure force of a pressure spring 7 between the vibrating body 2 and the abutment body 6. In comparison to a comparative configuration in which a vibrating body is held only by a pressure force, the frictional force acting between a flexible printed circuit board 5 of the vibrating body 2 and the abutment members 61 of the abutment body 6 can be significantly increased.

In the second modification example, the two vibrating bodies 2 disposed in parallel vibrate in synchronization with each other. The entire driving force (thrust force) generated by the two vibrating bodies 2 is therefore approximately twice that in a case where a single vibrating body 2 is used as in the present exemplary embodiment. In addition, since the permanent magnet 63 is disposed with respect to each one of the two vibrating bodies 2, the entire attraction force generated by the two permanent magnets 63 is approximately twice that in a case where a single permanent magnet 63 is used as in the present exemplary embodiment. Thus, also in view of the entirety of the vibration actuator 100, the maximum static frictional force acting between the flexible printed circuit board 5 of the vibrating body 2 and the abutment members 61 of the abutment body 6 is greater than the thrust force generated in the contact body 9. This results in significant inhibition of movement of the vibrating body 2 relative to the holding member 6 in driving of the vibration actuator 100. As described above, according to the second modification example, the vibration actuator achieves exertion of a great driving force (thrust force) as an actuator and also significant inhibition of movement of the vibrating body 2 relative to the holding member 6, whereby the vibration actuator that performs stable driving is achieved.

In the second modification example, a configuration in which two vibrating bodies 2 are disposed in parallel has been illustrated. Alternatively, three or more vibrating bodies 2 may be disposed in parallel. In this case, when the number of vibrating bodies 2 is M (M is an integer greater than or equal to 3), the entire driving force (thrust force) generated by the vibrating bodies 2 and the entire attraction force generated by the permanent magnets 63 are both approximately N times those in a case where a single vibrating body 2 is used.

The first and second modification examples can be employed in combination. In this case, M vibrating body groups (M is an integer greater than or equal to 2) each including M vibrating bodies 2 (M is an integer greater than or equal to 2) disposed in series may be disposed in parallel.

FIG. 7C is a plan view illustrating a vibrating body of a vibration actuator according to a third modification example.

In the third modification example, a description is given of a case where the vibration actuator includes a single vibrating body 2 in which four protruding members 31 (31-1, 31-2, 31-3, and 31-4) are disposed in the X-direction.

Similarly to the present exemplary embodiment, as an example, an elastic body 3 of the vibrating body 2 includes a magnetic body, and an abutment body 6 corresponding to the vibrating body 2 includes a permanent magnet 63. In the third modification example, a contact body 9 is disposed with respect to the vibrating body 2. The contact body 9 is fixed to a contact body holder 10. Four protruding members 31 (31-1, 31-2, 31-3, and 31-4) are disposed in the elastic body 3. Similarly to the present exemplary embodiment, two abutment members 61 (61-1 and 62-2) are disposed in the abutment body 6. On the outer peripheral surface of the elastic body 3, four extending portions 32 are disposed.

In the vibration actuator according to the third modification example, out-of-plane bending vibrations in two different vibration modes are induced in the vibrating body 2 by applying an alternating-current voltage to an electro-mechanical energy conversion element 4, and a vibration obtained by combining these vibrations is generated. These vibration modes include two vibration modes having a common node area that is of both the vibration modes and is shared between the two vibration modes. The two vibration modes, i.e., vibration modes A and B similar to those according to the present exemplary embodiment further include unique node areas that are of the respective vibration modes A and B and different between the vibration modes A and B.

The mode A as a first vibration mode is a first-order out-of-plane bending vibration mode with two node areas located on the both sides of the protruding members 31-1, 31-2, 31-3, and 31-4 in parallel in the X-direction, which is the longitudinal direction of the vibrating body 2. In a vibration in the vibration mode A, the protruding members 31-1, 31-2, 31-3, and 31-4 at four positions are displaced in the Z-direction, which is the pressure direction. The vibration mode B as a second vibration mode is a second-order out-of-plane bending vibration mode with three node areas located approximately parallel in the Y-direction, which is the short direction of the vibrating body 2. In a vibration in the vibration mode B, the protruding members 31-1, 31-2, 31-3, and 31-4 at four positions are displaced in the X-direction. The vibration mode B is not limited to a second-order vibration mode, and can also be an N-th order vibration mode (N is an integer greater than or equal to 1). Among the locations of intersection between the vibration modes A and B, two locations in the middle of the node area of the vibration mode B and the two abutment members 61 (61-1 and 62-2) of the abutment body 6 abut on each other. With this configuration, the abutment body 6 can efficiently hold and pressurize the vibrating body 2.

The vibrations in the vibration modes A and B are combined together, which causes the protruding members 31-1, 31-2, 31-3, and 31-4 at four positions in the vibrating bodies 2 to perform elliptical motions or circular motions in the ZX plane.

Bringing the contact body 9 into contact with the protruding members 31-1, 31-2, 31-3, and 31-4 generates a frictional force in the X-direction, and a driving force (thrust force) to move the vibrating body 2 and the contact body 9 relative to each other is generated. The vibration mode B may be a longitudinal vibration mode where the elastic body 3 is caused to expand and contract in the longitudinal direction, instead of the out-of-plane bending (lateral) vibration mode. In this case, the vibration mode B is a second-order lateral vibration mode with three node areas located approximately parallel in the Y-direction, which is the short direction of the vibrating body 2.

In the vibration actuator according to the third modification example, the permanent magnet 63 in the abutment body 6 disposed with respect to the vibrating body 2 has a size (an area) corresponding to the four protruding members 31-1, 31-2, 31-3, and 31-4 and is disposed such that one of the magnetic poles of the permanent magnet 63 is directed in the Z-direction. The vibrating body 2 and the abutment body 6 pull each other in the Z-direction by the magnetic action of the permanent magnet 63. Consequently, the attraction force of the permanent magnet 63 acts together with the pressure force of a pressure spring 7 between the vibrating body 2 and the abutment body 6. In comparison to a comparative configuration in which a vibrating body is held only by a pressure force, the frictional force acting between a flexible printed circuit board 5 of the vibrating body 2 and the abutment members 61 of the abutment body 6 can be significantly increased.

In the third modification example, the vibrating body 2 including the four protruding members 31-1, 31-2, 31-3, and 31-4 vibrates in synchronization with each other. Thus, the entire driving force (thrust force) generated by the vibrating body 2 is approximately twice that in a case where a vibrating body 2 including two protruding members 31-1 and 31-2 is used as in the present exemplary embodiment. On the other hand, the permanent magnet 63 is disposed with respect to the four protruding members 31-1, 31-2, 31-3, and 31-4 of the vibrating body 2. The entire attraction force generated by the permanent magnets 63 is approximately twice that in a case where a permanent magnet 63 having the size (the area) in the present exemplary embodiment is used. Thus, also in view of the entirety of the vibration actuator 100, the maximum static frictional force acting between the flexible printed circuit board 5 of the vibrating body 2 and the abutment members 61 of the abutment body 6 is greater than the thrust force generated in the contact body 9. This results in significant inhibition of movement of the vibrating body 2 relative to the corresponding abutment body 6 in the driving of vibration actuator 100. As described above, according to the third modification example, the vibration actuator achieves exertion of a great driving force (thrust force) as an actuator and also sufficient inhibition of movement of the vibrating body 2 relative to the holding member 6, whereby the vibration actuator that performs stable driving is realized.

In the third modification example, a vibrating body 2 including four protruding members 31 has been illustrated. Alternatively, a vibrating body 2 including 2M protruding members 31 (M is an integer greater than or equal to 3) may be used. In this case, the entire driving force (thrust force) generated by the vibrating body 2 and the entire attraction force generated by the permanent magnet 63 are both 2N times those in a case where a vibrating body 2 including two protruding members 31 is used. Because it is desirable that the number of protruding members 31 disposed to the vibrating body 2 and the number of protruding members 31 that simultaneously come into contact with the contact body 9 in vibration of the vibrating body 2 should be the same, it is desirable that the number of protruding members 31 in the vibrating body 2 should be one or 2M (M is an integer greater than or equal to 1). Alternatively, the number of protruding members 31 can be 2N+1.

Examples of other modification examples of the present exemplary embodiment include a vibration actuator having a configuration in which a contact body that comes into contact with a vibrating body, a holding member that holds the vibrating body, and a base as a pressure reception member are annular members, and a plurality of vibrating bodies is disposed with respect to the base. In this case, similarly to the present exemplary embodiment, as an example, elastic bodies of the vibrating bodies each include a magnetic body, and holding members corresponding to the vibrating bodies each include a permanent magnet.

Other modification examples of the present exemplary embodiment include a vibration actuator employing a configuration in which a pair of vibrating bodies is disposed to hold a contact body, and a pair of biasing members is disposed such that the pair of vibrating bodies are held between the pair of biasing members. The pair of biasing members applies pressure forces in a direction facing each other to the pair of vibrating bodies via a pair of abutment bodies (not illustrated) by the tension of an elastic member stretched between the pair of biasing members. In this case, similarly to the present exemplary embodiment, as an example, an elastic body disposed in each of the pair of vibrating bodies includes a magnetic body, and the abutment bodies that abut the vibrating bodies each include a permanent magnet.

A vibration actuator according to a second exemplary embodiment is described below. In the first exemplary embodiment, a vibration actuator having a configuration in which a single permanent magnet 63 is placed in an abutment body 6, and the center of the permanent magnet 63 in the X-direction matches the center of an elastic body 3 in the X-direction has been discussed. The present disclosure, however, is not limited to the configuration. The second exemplary embodiment is different from the first exemplary embodiment in the arrangement form of the permanent magnet. In the present exemplary embodiment, components other than a holding member and permanent magnets are similar to corresponding components in the first exemplary embodiment. Thus, reference numbers regarding the holding member and the permanent magnets are denoted by **100*s***, and the last two digits of the reference numbers are the same as those in the first exemplary embodiment.

Figure 8:
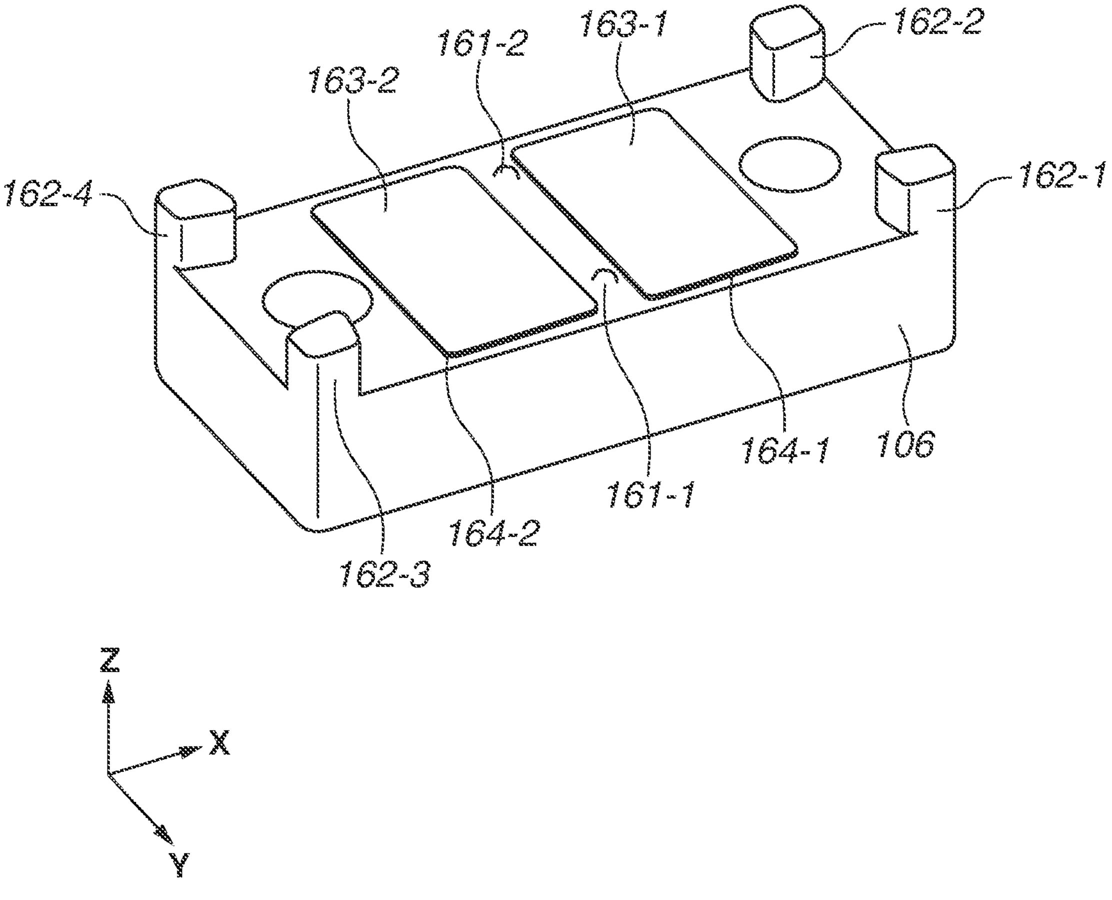
FIG. 8 is a perspective view illustrating a holding member of a vibration actuator according to a second exemplary embodiment.

FIG. 8 is a perspective view illustrating a holding member of the vibration actuator according to the second exemplary embodiment.

An attraction force by a magnetic force is generated between a vibrating body 2 and an abutment body 106 (a holding member 106) that abuts the vibrating body 2. A form is employed in which either one of the vibrating body 2 and the abutment body 106 includes a magnetic body, and the other of the vibrating body 2 and the abutment body 106 includes a magnet that applies an attraction force to the magnetic body. In the present exemplary embodiment, a plurality of magnets or magnetic bodies is disposed, and the plurality of magnets or magnetic bodies is arranged in the abutment body 106 symmetrically with respect to the center of an elastic body 3 in the X-direction. As an example, as illustrated in FIG. 8, the elastic body 3 includes magnetic bodies. The abutment body 106 includes two permanent magnets 163 (163-1 and 163-2) and two magnet hold portions 164 (164-1 and 164-2) into which the permanent magnets 163 are inserted and to which the permanent magnets 163 are fixed. The permanent magnets 163 and the abutment body 106 are joined together by an adhesive and joint member. As the permanent magnets 163, neodymium magnets may be employed. A modification example form (not illustrated) in which either one of the vibrating body 2 and the abutment body 106 includes a first magnetic body and a first magnet, and the other of the vibrating body 2 and the abutment body 106 includes a second magnet that applies a magnetic force to the first magnetic body, and a second magnetic body that receives a magnetic force from the first magnet can also be employed. Although a form is employed in which a magnet and a magnetic body are disposed together in one of the two components, a shielding effect occurs where the magnetic body disposed together with the magnet absorbs a part of the magnetic force line of the magnet disposed together with the magnetic body, and the magnetic force attenuates relative to other components. The above-described modification example form may be employed to utilize the effect of reducing the leakage of a magnetic field to outside.

In the present exemplary embodiment, the permanent magnets 163 are disposed such that one of the magnetic poles of each one of the permanent magnets 163 is directed in the Z-direction. The vibrating body 2 and the abutment body 106 pull each other in the Z-direction by the magnetic actions of the permanent magnets 163. Consequently, the attraction forces of the two permanent magnets 163-1 and 163-2 act together with the pressure force of a pressure spring 7 between the vibrating body 2 and the abutment body 106. In comparison to a comparative configuration in which a vibrating body is held only by a pressure force, the maximum static frictional force acting between a flexible printed circuit board 5 of the vibrating body 2 and protrusion portions 161-1 and 161-2 of the abutment body 106 can be significantly increased. This maximum static frictional force is greater than the thrust force generated in a contact body 9. Thus, movement of the vibrating body 2 relative to the abutment body 106 in driving of the vibration actuator 100 is significantly inhibited.

The two permanent magnets 163-1 and 163-2 have the same shape and size and are disposed in the abutment body 106 in such a manner that the two permanent magnets 163-1 and 163-2 are arranged at symmetrical positions with respect to the center position of the elastic body 3 of the vibrating body 2 in the X-direction. With this arrangement, the attraction forces acting on the elastic body 3 are the same on both sides of the center of the elastic body 3 in the X-direction, which prevents rotation of the vibrating body 2 about the Y-axis and causes the vibrating body 2 to be attracted toward the abutment body 106 perpendicularly to the Z-direction. Thus, in a state where the abutment body 106 and the vibrating body 2 are attracted by the permanent magnets 163, the contact body 9 can be stably moved relative to the vibrating body 2 with the vibrating body 2 being not tilted about the Y-axis relative to the contact body 9.

Further, the permanent magnets 163-1 and 163-2 are disposed in the abutment body 106 in such a manner that the center position of each one of the permanent magnets 163-1 and 163-2 in the Y-direction matches the center position of the elastic body 3 in the Y-direction. With this configuration, the attraction forces acting on the elastic body 3 are the same on the both sides of the center of the elastic body 3 in the Y-direction, which prevents rotation of the vibrating body 2 about the X-axis and causes the vibrating body 2 to be attracted toward the abutment body 106 perpendicularly to the Z-direction, whereby stable driving can be achieved.

The force pulling the vibrating body 2 and the abutment body 106 each other by the two permanent magnets 163-1 and 163-2 according to the present exemplary embodiment is, as an example, about 272 gf when it is calculated based on the size of each one of the permanent magnets 163 and the distance between the permanent magnets 163 and the elastic body 3. In this case, a force of about 572 gf obtained by combining about 272 gf and about 300 gf as an example of the pressure force of the pressure spring 7 acts on the vibrating body 2 and the abutment body 106 in the Z-direction. In comparison to not only a comparative configuration in which a vibrating body is held only by a pressure force, but also the first exemplary embodiment, the frictional force between the vibrating body 2 and the abutment body 106 can be significantly improved. Thus, even in a state where the coefficient of friction of the contact body 9 is improved, and the thrust force generated in the vibration actuator 100 is increased, a relative movement does not occur between the vibrating body 2 and the abutment body 106, whereby stable driving of the vibration actuator 100 can be achieved.

In the present exemplary embodiment, a case where the elastic body 3 includes magnetic bodies, and the permanent magnets 163 are disposed in the abutment body 106 has been illustrated. The present disclosure, however, is not limited to this. As an example, the elastic body 3 may be formed of permanent magnets, or permanent magnets may be disposed in the elastic body 3, and magnetic bodies may be disposed in at least a part, such as a central portion, of the abutment body 106. Also in this case, an expected attraction force by a magnetic force is generated between the vibrating body 2 and the abutment body 106. The elastic body 3 including the permanent magnets is a thin plate-like member or a film-like member. In a part of the abutment body 106, thin magnetic bodies may be disposed. With this configuration, increase in size of the abutment body 106 can be avoided, and the miniaturization of the vibration actuator 100 can be achieved in combination with the thin plate-like or film-like elastic body 3.

A vibration actuator according to a third exemplary embodiment is described below. In the first and second exemplary embodiments, the vibration actuators having the configuration in which a permanent magnet of a holding member and a vibrating body are in a laminated state in a planar view has been discussed. The present disclosure, however, is not limited to this. The third exemplary embodiment is different from the first and second exemplary embodiments in that magnets and a vibrating body are in a non-laminated state. In the present exemplary embodiment, components other than a holding member and permanent magnets are similar to corresponding components in the first and second exemplary embodiments. Thus, reference numbers regarding the holding member and the permanent magnets are denoted by the 200*s*, and the last two digits of the reference numbers are the same as those in the first and second exemplary embodiments.

Figure 9:
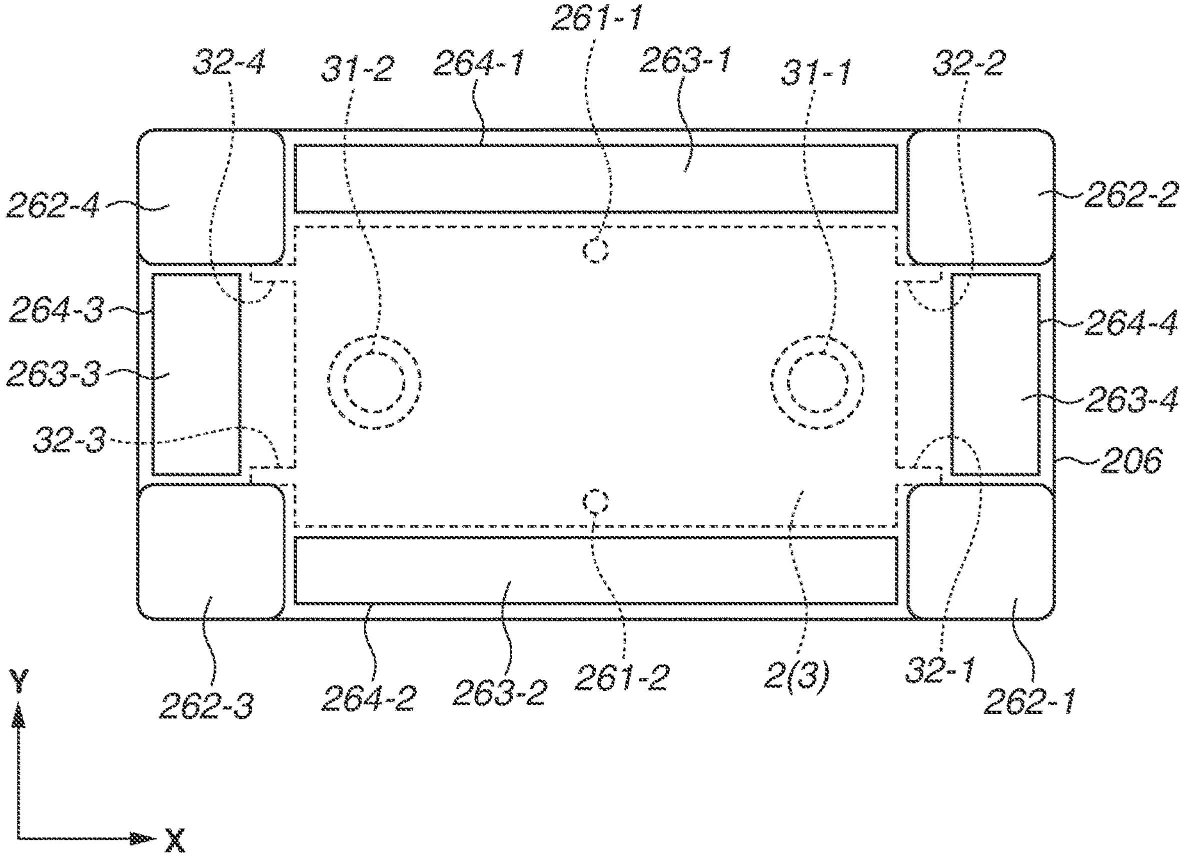
FIG. 9 is a plan view illustrating a holding member of a vibration actuator according to a third exemplary embodiment.

FIG. 9 is a plan view illustrating a holding member of the vibration actuator according to the third exemplary embodiment.

An attraction force by a magnetic force is generated between a vibrating body 2 and an abutment body 206 (a holding member 206) that abuts the vibrating body 2. A configuration in which either one of the vibrating body 2 and the abutment body 206 includes a magnetic body, and the other of the vibrating body 2 and the abutment body 206 includes a magnet that applies an attraction force to the magnetic body is employed. In the present exemplary embodiment, magnets or a magnetic body is disposed at a position, in the abutment body 206, surrounding the vibrating body 2 in such a manner that the magnets or the magnetic body is in a non-laminated state with the vibrating body 2 in a planar view. As illustrated in FIG. 9, as an example, an elastic body 3 includes a magnetic body. The abutment body 206 includes four permanent magnets 263 (263-1, 263-2, 263-3, and 263-4) that are cuboid neodymium magnets, and four magnet hold portions 264 (264-1, 264-2, 264-3, and 264-4) into which the permanent magnets 263 are inserted and to which the permanent magnets 263 are fixed. The permanent magnets 263 and the abutment body 206 are joined together by an adhesive.

In the present exemplary embodiment, the permanent magnets 263 are disposed such that one of the magnetic poles of each one of the permanent magnets 263 is directed in the Z-direction. The vibrating body 2 and the abutment body 206 are pulled toward each other in the Z-direction by the magnetic actions of the permanent magnets 263. The attraction forces of the four permanent magnets 263-1, 263-2, 263-3, and 263-4 act together with the pressure force of a pressure spring 7 between the vibrating body 2 and the abutment body 206. In comparison to a comparative configuration in which a vibrating body is held only by a pressure force, the maximum static frictional force acting between a flexible printed circuit board 5 of the vibrating body 2 and protrusion portions 261-1 and 261-2 of the abutment body 206 are significantly increased. This maximum static frictional force is greater than the thrust force generated in a contact body 9. Thus, movement of the vibrating body 2 relative to the abutment body 206 is significantly inhibited in driving of the vibration actuator 100.

The permanent magnets 263-1 and 263-2 are formed in the same shape and size, and the permanent magnets 263-3 and 263-4 are formed in the same shape and size. The permanent magnets 263-1 and 263-2 are disposed in the abutment body 206 in such a manner that the permanent magnets 263-1 and 263-2 are arranged at symmetrical positions with respect to the center position of the elastic body 3 of the vibrating body 2 in the X-direction. The permanent magnets 263-3 and 263-4 are disposed in the abutment body 206 in such a manner that the permanent magnets 263-3 and 263-4 are arranged at symmetrical positions with respect to the center position of the elastic body 3 of the vibrating body 2 in the Y-direction.

With this configuration, the attraction forces acting on the elastic body 3 are the same on the both sides of the center of the elastic body 3 in the X-direction and are the same on both sides of the center of the elastic body 3 in the Y-direction, which prevents rotation of the vibrating body 2 about the Y-axis and the X-axis and causes the vibrating body 2 to be attracted toward the abutment body 206 perpendicularly to the Z-direction. Thus, even in a state where the abutment body 206 and the vibrating body 2 are attracted by the permanent magnets 263, the contact body 9 can be stably moved relative to the vibrating body 2 with the vibrating body 2 being not tilted about the X-axis and the Y-axis relative to the contact body 9.

If the contact body 9 includes a magnetic material, such as martensitic stainless steel, the permanent magnets 263 and the contact body 9 may pull each other, albeit slightly, and the pressure force between the vibrating body 2 and the contact body 9 may increase. The permanent magnets 263, however, are disposed on the abutment body 206 around the vibrating body 2 and separately from the vibrating body 2, and the distance between the contact body 9 and the permanent magnets 263 is greater than the distance between the vibrating body 2 and the permanent magnets 263. Thus, the force of the permanent magnets 263 and the contact body 9 pulling each other is very weaker than the force of the permanent magnets 263 and the vibrating body 2 pulling each other. The force of the permanent magnets 263 and the contact body 9 pulling each other does not influence the motor performance, and the durability does not deteriorate, either.

In the present exemplary embodiment, a case where the elastic body 3 includes a magnetic body, and the permanent magnets 263 are disposed in the abutment body 206 has been illustrated. The present disclosure, however, is not limited to this. As an example, the elastic body 3 may be formed of permanent magnets, or permanent magnets may be disposed in the elastic body 3, and a magnetic body may be disposed in at least a part, such as a central portion, of the abutment body 206. Also in this case, expected attraction force by a magnetic force is generated between the vibrating body 2 and the abutment body 206. The elastic body 3 including the permanent magnets is a thin plate-like member or a film-like member. In a part of the abutment body 206, a thin magnetic body may be disposed. With this configuration, increase in size of the abutment body 206 can be avoided, and the miniaturization of the vibration actuator 100 can be achieved in combination with the thin plate-like or film-like elastic body 3.

An imaging apparatus according to a fourth exemplary embodiment is described below. In the present exemplary embodiment, an imaging apparatus is illustrated as an example of a driving device. An imaging apparatus 300 according to the present exemplary embodiment includes one of the vibration actuators 100 according to the first exemplary embodiment, the modification examples, and the second and third exemplary embodiments.

Figure 10:
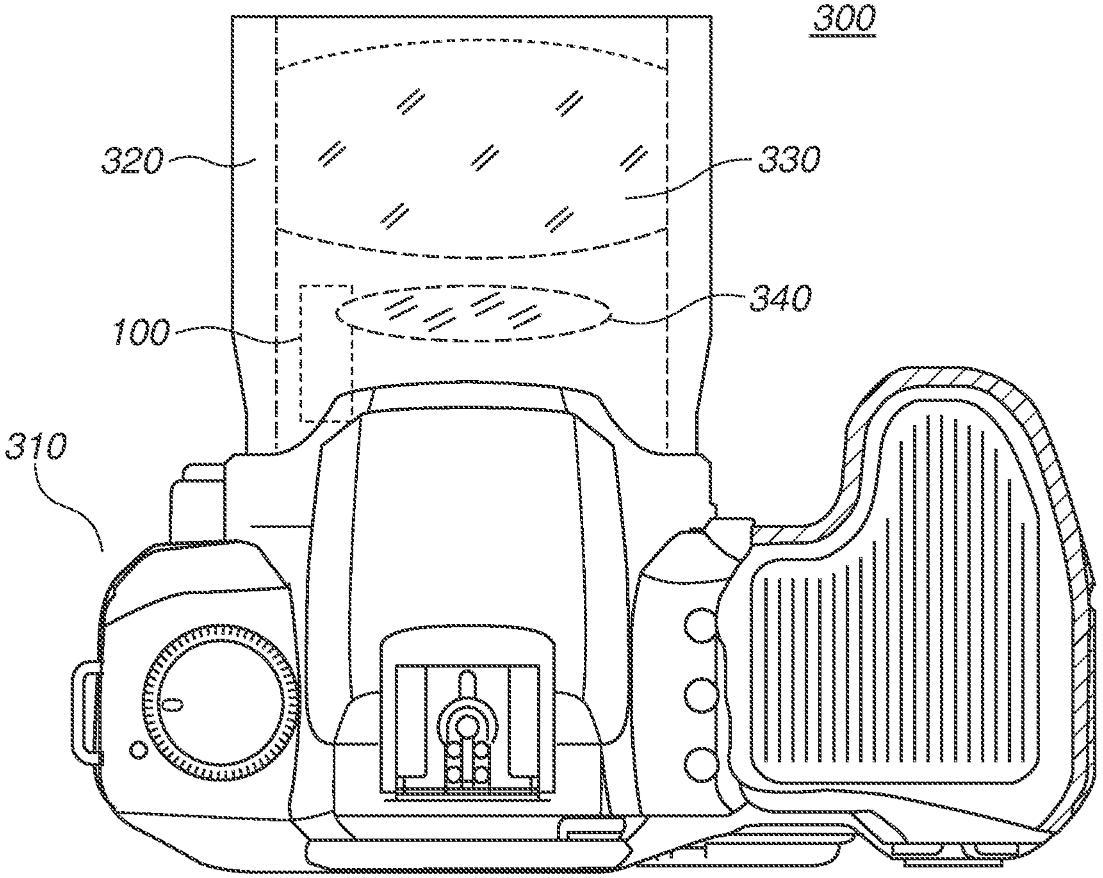
FIG. 10 is a top view illustrating a general configuration of an imaging apparatus according to a fourth exemplary embodiment.

FIG. 10 is a top view illustrating the general configuration of the imaging apparatus according to the fourth exemplary embodiment.

The imaging apparatus 300 includes an imaging apparatus main body 310 including an imaging sensor (not illustrated) on which light passed through a lens forms an image, and a lens barrel 320 attachable to and detachable from the imaging apparatus main body 310. The lens barrel 320 includes a plurality of lens groups 330 (lenses), a focus adjustment lens 340 (a lens), and the vibration actuator 100. A lens holding frame (not illustrated) holding the focus adjustment lens 340 is linked to the contact body holder 10 serving as a moving body in the vibration actuator 100. Driving the vibration actuator 100 causes the focus adjustment lens 340 to be driven in the optical axis direction to adjust the focus on an object.

In a case where a zoom lens is disposed in the lens barrel 320, the vibration actuator 100 can also be used as a driving source that moves the zoom lens in the optical axis direction. Further, in a case where an image blur correction lens is disposed in the lens barrel 320, the vibration actuator 100 can be used as a driving source to drive the image blur correction lens in a plane orthogonal to the optical axis.

A microscope 400 according to a fifth exemplary embodiment is described below. In the present exemplary embodiment, a microscope (a stage apparatus) is illustrated as an example of a driving device. The microscope 400 according to the present exemplary embodiment includes one of the vibration actuators 100 according to the first exemplary embodiment, the modification examples, and the second and third exemplary embodiments.

Figure 11:
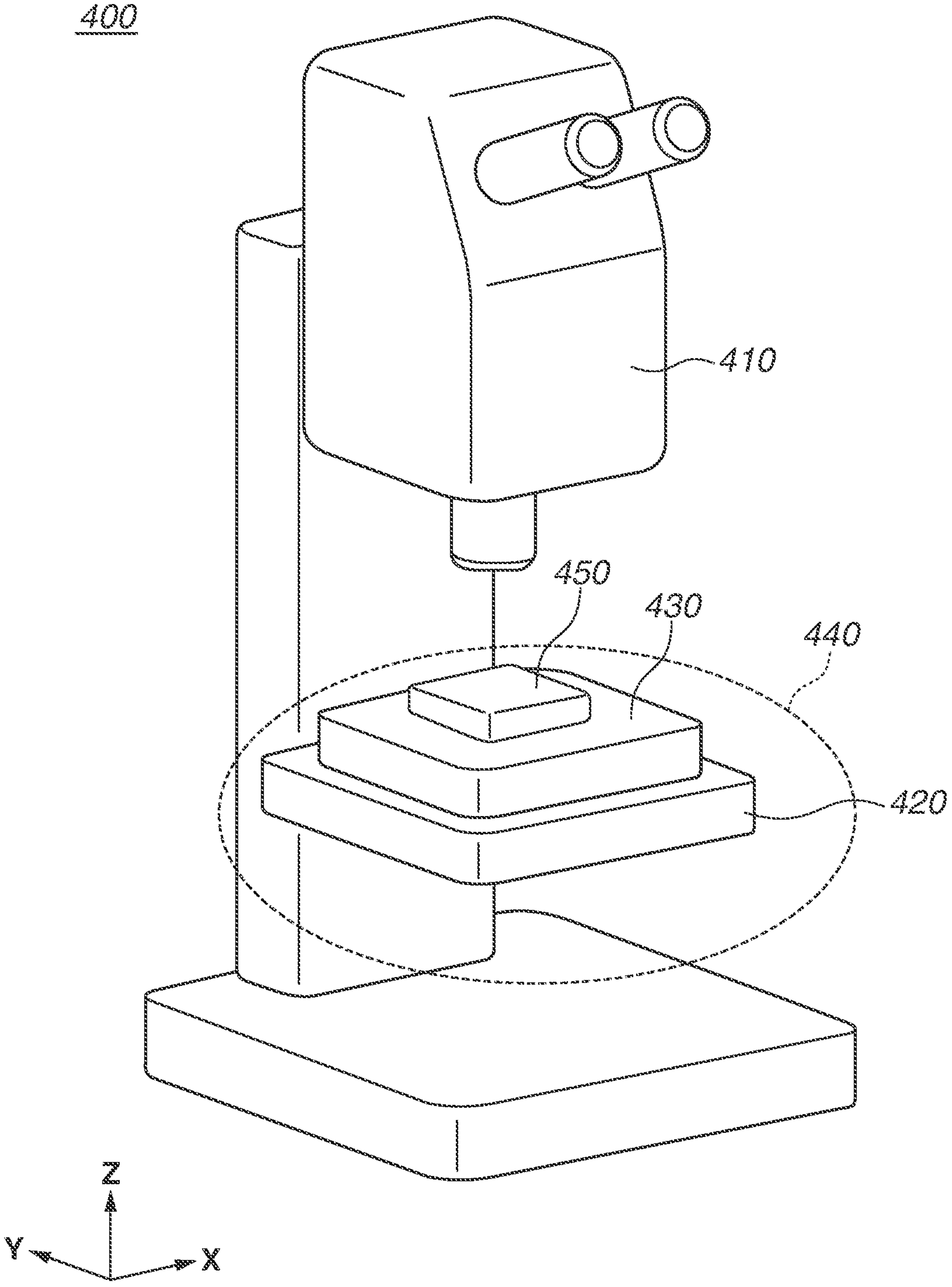
FIG. 11 is a perspective view illustrating a general configuration of a microscope according to a fifth exemplary embodiment.

FIG. 11 is a perspective view illustrating the general configuration of the microscope 400 according to the fifth exemplary embodiment.

In the present exemplary embodiment, the microscope 400 including a stage movable in an XY plane is discussed as an example of an apparatus including at least two or more vibration actuators 100.

The microscope 400 includes an imaging unit 410 having an imaging sensor (not illustrated) and an optical system built-in, and an automatic stage 440. The automatic stage 440 includes a base 420, a first vibration actuator (not illustrated) and a second vibration actuator (not illustrated) disposed on the base 420, and a stage 430 that is disposed on the base 420 and is moved in the XY plane. As each of the first and second vibration actuators, one of the vibration actuators 100 according to the first exemplary embodiment, the modification examples, and the second and third exemplary embodiments is used.

The first vibration actuator is used as a driving apparatus that drives the stage 430 in the X-direction on the base 420. The first vibration actuator is disposed such that a relative movement direction between the of the vibrating body 2 and a part of the contact body 9 matches the X-direction of the stage 430.

The second vibration actuator is used as a driving apparatus that drives the stage 430 in the Y-direction on the base 420. The second vibration actuator is disposed such that a relative movement direction between the vibrating body 2 and a part of the contact body 9 matches the Y-direction of the stage 430.

An observation target object 450 is placed on the upper surface of the stage 430, and an enlarged image of the observation target object 450 is captured by the imaging unit 410. If the observation range is a wide range, the observation target object 450 is moved by moving the stage 430 in an in-plane direction by driving the automatic stage 440 using the first and second vibration actuators, whereby imaging region is changed. Images captured in different imaging regions are combined together by image processing by a computer (not illustrated), whereby a high-definition image with a wide observation range can be acquired.

While the present disclosure has been described above in detail based on its suitable exemplary embodiments and modification examples, the present disclosure is not limited to these specific exemplary embodiments or modification examples. The present disclosure also includes various forms without departing from the spirit and scope of the disclosure. Further, the above exemplary embodiments and modification examples merely illustrate exemplary embodiments of the present disclosure, and can also be appropriately combined together.

The disclosure of the exemplary embodiments and the modification examples includes the following configurations.

(Configuration 1)

A vibration actuator comprising:

a vibrating body configured to include an electro-mechanical energy conversion element and an elastic body and have two vibration modes having a common node area that is of both the two vibration modes and is shared between the two vibration modes;

a contact body configured to come into contact with the elastic body; and an abutment body configured to include an abutment member that abuts on the common node area on a side opposite to a side on which the abutment body faces the contact body, wherein the vibration actuator is configured such that an attraction force between the vibrating body and the abutment body is generated by a magnetic force.

(Configuration 2)

The vibration actuator according to Configuration 1, wherein either one of the vibrating body and the abutment body includes a magnetic body, and wherein the other of the vibrating body and the abutment body includes a magnet, an attraction force of which acts on the magnetic body.

(Configuration 3)

The vibration actuator according to configuration 2, wherein the magnet or the magnetic body is disposed in a central portion of the abutment body, and wherein the elastic body is disposed in the abutment body in such a manner that positions of the elastic body and the magnet or the magnetic body match each other.

(Configuration 4)

The vibration actuator according to Configuration 2, wherein a plurality of the magnets or the magnetic bodies is arranged symmetrically in the abutment body with respect to a center of the elastic body in a relative movement direction of the contact body.

(Configuration 5)

The vibration actuator according to Configuration 2, wherein the magnet or the magnetic body is disposed at a position, in the abutment body, surrounding the vibrating body in such a manner that the magnet or the magnetic body is in a non-laminated state with the vibrating body in a planar view.

(Configuration 6)

The vibration actuator according to any one of Configurations 2 to 5, wherein the magnet is disposed such that one of magnetic poles of the magnet is directed in a pressurizing direction between the elastic body and the contact body.

(Configuration 7)

The vibration actuator according to any one of Configurations 1 to 5, wherein a maximum static frictional force acting between the vibrating body and the abutment member is greater than a thrust force acting on the contact body.

(Configuration 8)

The vibration actuator according to any one of Configurations 1 to 7, wherein the two vibration modes have respective unique node areas that are different between the two vibration modes.

(Configuration 9)

The vibration actuator according to Configuration 8, wherein the two vibration modes are a first-order out-of-plane bending vibration mode with two node areas located in a longitudinal direction of the elastic body, and an N-th order vibration mode with N+1 node areas, where N is an integer greater than or equal to 1, located in a short direction of the elastic body.

(Configuration 10)

The vibration actuator according to Configuration 9, wherein the abutment member of the abutment body abuts on a node area located in a middle of the N+1 node areas of the N-th order vibration mode.

(Configuration 11)

The vibration actuator according to any one of Configurations 1 to 10, further comprising a plurality of the vibrating bodies disposed in series, in parallel, or in series and parallel, in a relative movement direction of the contact body.

(Configuration 12)

The vibration actuator according to any one of Configurations 1 to 11, wherein the abutment body includes one or 2M abutment members, where M is an integer greater than or equal to 1, configured to abut on the contact body.

(Configuration 13)

The vibration actuator according to any one of Configurations 1 to 12, wherein the elastic body includes at least two extending members on an outer peripheral surface of the elastic body, wherein the abutment body includes engagement members corresponding to the extending members, and wherein the extending members are in contact with the engagement portions.

(Configuration 14)

The vibration actuator according to Configuration 13, wherein the plurality of engagement members supports four corners of the outer peripheral surface of the elastic body in a loose fitting manner.

(Configuration 15)

The vibration actuator according to any one of Configurations 1 to 14, wherein either one of the contact body and the abutment body includes an output side joint member that is joined to a driving target body, and wherein the other of the contact body and the abutment body includes a base material side joint member that is joined to a base material serving as a reference for driving of the driving target body.

(Configuration 16)

The vibration actuator according to any one of Configurations 1 to 15, wherein one of the contact body and the vibrating body moves relative to the other.

(Configuration 17)

A driving device comprising:

a member; and a vibration actuator configured to move the member, wherein the vibration actuator includes a vibrating body configured to include an electro-mechanical energy conversion element and an elastic body and have two vibration modes having a common node area that is of both the two vibration modes and is shared between the two vibration modes, a contact body configured to come into contact with the elastic body, and an abutment body configured to include an abutment member that abuts on the common node area on a side opposite to a side on which the abutment body faces the contact body, and wherein the vibration actuator is configured such that an attraction force between the vibrating body and the abutment body is generated by a magnetic force.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-021649, filed Feb. 15, 2023, which is hereby incorporated by reference herein in its entirety.

What is claimed is:

1. A vibration actuator comprising:

a vibrating body configured to include an electro-mechanical energy conversion element and an elastic body and have two vibration modes having a common node area that is of both the two vibration modes and is shared between the two vibration modes;

a contact body configured to come into contact with the elastic body; and an abutment body configured to include an abutment member that abuts on the common node area on one surface of the vibrating body, the one surface being opposite to another surface of the vibrating body facing the contact body, wherein the vibration actuator is configured such that an attraction force between the vibrating body and the abutment body is generated by a magnetic force.

2. The vibration actuator according to claim 1, wherein the two vibration modes have respective unique node areas that are different between the two vibration modes.

3. The vibration actuator according to claim 1, wherein a maximum static frictional force acting between the vibrating body and the abutment member is greater than a thrust force acting on the contact body.

4. The vibration actuator according to claim 1, wherein the two vibration modes are a first-order out-of-plane bending vibration mode with two node areas located in a longitudinal direction of the elastic body, and an N-th order vibration mode with N+1 node areas, where N is an integer greater than or equal to 1, located in a short direction of the elastic body.

5. The vibration actuator according to claim 4, wherein the abutment member of the abutment body abuts on a node area located in a middle of the N+1 node areas of the N-th order vibration mode.

6. The vibration actuator according to claim 1, further comprising a plurality of vibrating bodies disposed in series, in parallel, or in series and parallel, in a relative movement direction of the contact body.

7. The vibration actuator according to claim 1, wherein the abutment body includes one or 2M abutment members, where M is an integer greater than or equal to 1, configured to abut on the contact body.

8. The vibration actuator according to claim 1, wherein either one of the vibrating body and the abutment body includes a magnetic body, and the other of the vibrating body and the abutment body includes a magnet having an attraction force that acts on the magnetic body.

9. The vibration actuator according to claim 8, wherein a plurality of magnets or the magnetic body is disposed symmetrically in the abutment body with respect to a center of the elastic body in a relative movement direction of the contact body.

10. The vibration actuator according to claim 8, wherein the magnet or the magnetic body is disposed at a position, in the abutment body, surrounding the vibrating body in such a manner that the magnet or the magnetic body is in a non-laminated state with the vibrating body in a planar view.

11. The vibration actuator according to claim 8, wherein the magnet is disposed such that one of magnetic poles, which are a south(S) pole and a north (N) pole, of the magnet is directed in a direction in which the elastic body pressurizes the contact body.

12. The vibration actuator according to claim 8, wherein the abutment body has a magnet hold structure that holds the magnet.

13. The vibration actuator according to claim 1, wherein the elastic body includes at least two extending members on an outer peripheral surface of the elastic body, the abutment body includes a plurality of engagement members corresponding to the at least two extending members, and the at least two extending members are in contact with the plurality of engagement members.

14. The vibration actuator according to claim 13, wherein the plurality of engagement members supports four corners of the outer peripheral surface of the elastic body in a loose fitting manner.

15. The vibration actuator according to claim 1, wherein either one of the contact body and the abutment body includes an output side joint member that is joined to a driving target body, and wherein the other of the contact body and the abutment body includes a base material side joint member that is joined to a base material serving as a reference for driving of the driving target body.

16. The vibration actuator according to claim 1, wherein one of the contact body and the vibrating body is configured to move relative to the other of the contact body and the vibrating body.

17. A lens barrel comprising:

a lens; and the vibration actuator according to claim 1 and configured to drive the lens.

18. An imaging apparatus comprising:

an imaging sensor; and the vibration actuator according to claim 1 and configured to drive the imaging sensor.

19. A driving device comprising:

a member; and a vibration actuator configured to move the member, wherein the vibration actuator includes:

a vibrating body configured to include an electro-mechanical energy conversion element and an elastic body and have two vibration modes having a common node area that is of both the two vibration modes and is shared between the two vibration modes, a contact body configured to come into contact with the elastic body, and an abutment body configured to include an abutment member that abuts on the common node area on one surface of the vibrating body, the one surface being opposite to another surface of the vibrating body facing the contact body, and wherein the vibration actuator is configured such that an attraction force between the vibrating body and the abutment body is generated by a magnetic force.

* * * * *